United States Patent [19]
Scott

[11] Patent Number: 4,701,960
[45] Date of Patent: Oct. 20, 1987

[54] SIGNATURE VERIFICATION

[75] Inventor: Warner C. Scott, Dallas, Tex.

[73] Assignee: Texas Instruments Incorporated, Dallas, Tex.

[21] Appl. No.: 833,508

[22] Filed: Feb. 20, 1986

Related U.S. Application Data

[63] Continuation of Ser. No. 546,786, Oct. 28, 1983, abandoned.

[51] Int. Cl.⁴ .............................................. G06K 9/46
[52] U.S. Cl. ......................................... 382/3; 382/13; 382/21
[58] Field of Search ................................ 382/3, 13, 21

[56] References Cited
U.S. PATENT DOCUMENTS 4,513,439 4/1985 Gorgone et al. ...................... 382/7

Primary Examiner—Leo H. Boudreau
Attorney, Agent, or Firm—David V. Carlson; N. Rhys Merrett; Melvin Sharp

[57] ABSTRACT

Disclosed is a method for determining whether or not two signatures were written by the same individual. An X-Y data tablet indicates the location of the writing instrument at a predetermined clock pulse rate as the signature is written. A number string is generated which indicates the relationship between sequentially determined locations of the writing instrument as it moves to different locations on the X-Y data tablet. The quantity of numbers within the number string is an indication of the distance between sequentially determined locations and the value of the numbers within the number string is an indication of the direction of movement between sequentially determined locations. Series of number strings form a waveform representative of the signature as written by the individual. The waveform of the sample signature is compared with the waveform of a reference signature and an output is provided indicating whether or not the sample signature and the reference signature were made by the same individual.

8 Claims, 22 Drawing Figures

*Warner C. Scott*

*Fig. 1a*

*Warner C. Scott*

*Fig. 2a*

*Warner C. Scott*

*Fig. 3a*

| 13 | 12 | 11 | 11 | 10 | 10 | 9 | 9 | 9 | 9 | 9 | 9 | 9 | 10 | 10 | 11 | 11 | 12 | 13 |
|----|----|----|----|----|----|---|---|---|---|---|---|---|----|----|----|----|----|----|
| 12 | 11 | 11 | 10 | 9 | 9 | 9 | 8 | 8 | 8 | 8 | 8 | 9 | 9 | 9 | 10 | 11 | 11 | 12 |
| 11 | 11 | 10 | 9 | 9 | 8 | 8 | 7 | 7 | 7 | 7 | 7 | 8 | 8 | 9 | 9 | 10 | 11 | 11 |
| 11 | 10 | 9 | 8 | 8 | 7 | 7 | 6 | 6 | 6 | 6 | 6 | 7 | 7 | 8 | 8 | 9 | 10 | 11 |
| 10 | 9 | 9 | 8 | 7 | 6 | 6 | 5 | 5 | 5 | 5 | 5 | 6 | 6 | 7 | 8 | 9 | 9 | 10 |
| 10 | 9 | 8 | 7 | 6 | 6 | 5 | 4 | 4 | 4 | 4 | 4 | 5 | 6 | 6 | 7 | 8 | 9 | 10 |
| 9 | 9 | 8 | 7 | 6 | 5 | 4 | 4 | 3 | 3 | 3 | 4 | 4 | 5 | 6 | 7 | 8 | 9 | 9 |
| 9 | 8 | 7 | 6 | 5 | 4 | 4 | 3 | 2 | 2 | 2 | 3 | 4 | 4 | 5 | 6 | 7 | 8 | 9 |
| 9 | 8 | 7 | 6 | 5 | 4 | 3 | 2 | 1 | 1 | 1 | 2 | 3 | 4 | 5 | 6 | 7 | 8 | 9 |
| 9 | 8 | 7 | 6 | 5 | 4 | 3 | 2 | 1 | X | 1 | 2 | 3 | 4 | 5 | 6 | 7 | 8 | 9 |
| 9 | 8 | 7 | 6 | 5 | 4 | 3 | 2 | 1 | 1 | 1 | 2 | 3 | 4 | 5 | 6 | 7 | 8 | 9 |
| 9 | 8 | 7 | 6 | 5 | 4 | 4 | 3 | 2 | 2 | 2 | 3 | 4 | 4 | 5 | 6 | 7 | 8 | 9 |
| 9 | 9 | 8 | 7 | 6 | 5 | 4 | 4 | 3 | 3 | 3 | 4 | 4 | 5 | 6 | 7 | 8 | 9 | 9 |
| 10 | 9 | 8 | 7 | 6 | 6 | 5 | 4 | 4 | 4 | 4 | 4 | 5 | 6 | 6 | 7 | 8 | 9 | 10 |
| 10 | 9 | 9 | 8 | 7 | 6 | 6 | 5 | 5 | 5 | 5 | 5 | 6 | 6 | 7 | 8 | 9 | 9 | 10 |
| 11 | 10 | 9 | 8 | 8 | 7 | 7 | 6 | 6 | 6 | 6 | 6 | 7 | 7 | 8 | 8 | 9 | 10 | 11 |
| 11 | 11 | 10 | 9 | 9 | 8 | 8 | 7 | 7 | 7 | 7 | 7 | 8 | 8 | 9 | 9 | 10 | 11 | 11 |
| 12 | 11 | 11 | 10 | 9 | 9 | 9 | 8 | 8 | 8 | 8 | 8 | 9 | 9 | 9 | 10 | 11 | 11 | 12 |
| 13 | 12 | 11 | 11 | 10 | 10 | 9 | 9 | 9 | 9 | 9 | 9 | 9 | 10 | 10 | 11 | 11 | 12 | 13 |

| 32 | 29 | 27 | 24 | 21 | 17 | 13 | 9 | 4 | 0 | 252 | 247 | 243 | 239 | 235 | 232 | 229 | 227 | 224 |
|---|---|---|---|---|---|---|---|---|---|---|---|---|---|---|---|---|---|---|
| 35 | 32 | 29 | 26 | 23 | 19 | 15 | 10 | 5 | 0 | 251 | 246 | 241 | 237 | 233 | 230 | 227 | 224 | 221 |
| 37 | 35 | 32 | 29 | 25 | 21 | 17 | 11 | 6 | 0 | 250 | 245 | 239 | 235 | 231 | 227 | 224 | 221 | 219 |
| 40 | 38 | 35 | 32 | 28 | 24 | 19 | 13 | 7 | 0 | 249 | 243 | 237 | 232 | 228 | 224 | 221 | 218 | 216 |
| 43 | 41 | 39 | 36 | 32 | 27 | 22 | 16 | 8 | 0 | 248 | 240 | 234 | 229 | 224 | 220 | 217 | 215 | 213 |
| 47 | 45 | 43 | 40 | 37 | 32 | 26 | 19 | 10 | 0 | 246 | 237 | 230 | 224 | 219 | 216 | 213 | 211 | 209 |
| 51 | 49 | 47 | 45 | 42 | 38 | 32 | 24 | 13 | 0 | 243 | 232 | 224 | 218 | 214 | 211 | 209 | 207 | 205 |
| 55 | 54 | 53 | 51 | 48 | 45 | 40 | 32 | 19 | 0 | 237 | 224 | 216 | 211 | 208 | 205 | 203 | 202 | 201 |
| 60 | 59 | 58 | 57 | 56 | 54 | 51 | 45 | 32 | 0 | 224 | 211 | 205 | 202 | 200 | 199 | 198 | 197 | 196 |
| 64 | 64 | 64 | 64 | 64 | 64 | 64 | 64 | 64 | x | 192 | 192 | 192 | 192 | 192 | 192 | 192 | 192 | 192 |
| 68 | 69 | 70 | 71 | 72 | 74 | 77 | 83 | 96 | 128 | 160 | 173 | 179 | 182 | 184 | 185 | 186 | 187 | 188 |
| 73 | 74 | 75 | 77 | 80 | 83 | 88 | 96 | 109 | 128 | 147 | 160 | 168 | 173 | 176 | 179 | 181 | 182 | 183 |
| 77 | 79 | 81 | 83 | 86 | 90 | 96 | 104 | 115 | 128 | 141 | 152 | 160 | 166 | 170 | 173 | 175 | 177 | 179 |
| 81 | 83 | 85 | 88 | 91 | 96 | 102 | 109 | 118 | 128 | 138 | 147 | 154 | 160 | 165 | 168 | 171 | 173 | 175 |
| 85 | 87 | 89 | 92 | 96 | 101 | 106 | 112 | 120 | 128 | 136 | 144 | 150 | 155 | 160 | 164 | 167 | 169 | 171 |
| 88 | 90 | 93 | 96 | 100 | 104 | 109 | 115 | 121 | 128 | 135 | 141 | 147 | 152 | 156 | 160 | 163 | 166 | 168 |
| 91 | 93 | 96 | 99 | 103 | 107 | 111 | 117 | 122 | 128 | 134 | 139 | 145 | 149 | 153 | 157 | 160 | 163 | 165 |
| 93 | 96 | 99 | 102 | 105 | 109 | 113 | 118 | 123 | 128 | 133 | 138 | 143 | 147 | 151 | 154 | 157 | 160 | 163 |
| 96 | 99 | 101 | 104 | 107 | 111 | 115 | 119 | 124 | 128 | 132 | 137 | 141 | 145 | 149 | 152 | 155 | 157 | 160 |

START A SQUARE

SIGNATURE VERIFICATION

This application is a continuation of application Ser. No. 546,786, filed Oct. 28, 1983, now abandoned.

BACKGROUND OF THE INVENTION

This invention is in the field of Signature Verification. The invention is more particularly directed towards a method of determining whether or not an individual signing his name is the same individual who signed the same name which was provided as a reference signature by this individual. According to this invention the movement of the writing instrument as the name is signed is used to provide a series of data points represents of that person's signature.

Related applications which describe a method of reading typed text which are commonly assigned and are hereby incorporated by reference are as follows. Ser. No. 115,986, filed Jan. 28, 1980, Inventor, Warner C. Scott; Inventor Warner C. Scott; Ser. No. 153,342, filed May 27, 1980, Inventor, Warner C. Scott; Ser. No. 501,037, filed June 1, 1983, Inventor, Warner C. Scott; Ser. No. 527,152, filed Aug. 26, 1983, Inventor, Warner C. Scott; Ser. No. 527,702, filed Aug. 26, 1983, Inventors, Warner C. Scott, Keith A. Blanton, Steven Petersen and Ramon Helms; Ser. No. 527,151, filed Aug. 26, 1983, Inventors, Steven Petersen, Keith Blanton and Ramon Helms; Ser. No. 527,155, filed Aug. 26, 1983, Inventors Keith Blanton, Steven Petersen and Ramon Helms; Ser. No. 527,731, filed Aug. 26 1983, Inventors, Keith Blanton, Steven Petersen and Ramon Helms; Ser. No. 527,150, filed Aug. 26, 1983, Inventors, Steven Petersen, Keith Blanton and Ramon Helms; Ser. No. 546,782, filed Oct. 27, 1983, inventor, Warner C. Scott; Ser. No. 546,752, filed Oct. 27, 1983, C. Scott filed concurrently herewith.

It is desirable for a different application to verify that an individual signing a particular name is in fact the individual whose name he is signing. One method of determining whether or not the identity of the person matches the name he has signed is the use of signature verification. According to this invention an individual provides a reference signature by signing his name a plurality of times to enroll his signature. A signature selected from those provided is a reference signature representative of that persons signature when they sign their own name. At a later point in time when an individual purports to be the same individual who provided the reference signature that individual is required to replicate the reference signature. This replication is known as the sample or data signature and provides a series of data points for comparison with a reference signature which it purports to match. The sample signature and reference signature are compared with each other and an indication is given whether or not the same individual signed both of the signatures.

This invention would find use in the banking industry, where a person could simply sign his name to indicate his identity and the signature of the name alone would be sufficient verification of identity to allow the bank to dispense funds. This could be done through an automatic teller machine or other device, thus saving considerable funds in hiring extra tellers to provide this service. Additionally, this could find use in many other applications, such as, access to particular locations, use of credit cards, or other times when the identity of the individual signing the name must be verified.

This invention uses unique factors and a combination of unique factors to determine whether or not handwritten signatures belong to the same individual. The approach of this invention is to gather data as the text is written. In this embodiment the writing is performed on a data tablet which records the location of the pen at a point in time on the clock pulse. The data tablet provides the X and Y coordinate of the pen at the point in time that the data is sampled. The X and Y coordinate of each data point is used to produce a one-dimensional waveform of the character as it was written. The waveform of the character has as the abscissa the path length of the pen and as the ordinate the direction of movement. This one-dimensional array of the data is an important beginning to a simplification of an individual's signature. It is important to note that the abscissa of the plot as shown in the accompanying figures is path length and not time. This means that individual handwriting speed, writing part of the letter faster than another part and other variations thereon do not affect performance in any way.

The X-Y data tablet indicates the location of the writing instrument at a predetermined clock pulse rate as the signature is written. A number string is generated which indicates the relationship between sequentially determined locations of the writing instrument as it moves to different locations on the X-Y data tablet. The quantity of numbers within the number string is an indication of the distance between sequentially determined locations and the value of the numbers within the number string is an indication of the direction of movement between sequentially determined locations. Series of number strings form a waveform representative of the signature as written by the individual. The waveform of the sample signature is compared with the waveform of a reference signature and an output is provided indicating whether or not the sample signature and the reference signature were made by the same individual. The two waveforms are compared to each other by size normalizing the waveforms, aligning the buoys of the waveforms with each other, determining the integral of the difference between the waveforms for various buoy alignments and providing an integral of the difference of the waveforms for their entire length. The integral is then divided by the number of data points within the signature so that an average difference between the two waveforms is provided. The average difference between the two waveforms provides an indication whether or not the same individual signed both signatures.

Signatures can be compared both qualitatively and quantitatively to determine the degree of match between the signatures. A person or handwriting expert reading the text may perform qualitative analysis and look for similarities in a qualitative manner. However, it is difficult for a computer to perform qualitative analysis. One object and advantage of this invention is the placing of handwritten signatures having numerous qualitative features into a quantitative form. This in effect quantitizes the numerous qualitative features. The quantitative form may then be analyzed by a computer and a quantitative output of the computer or microprocessor takes into account numerous qualitative features which is achieved through use of the waveforms and various comparison techniques.

The applicant has also provided a way of placing a handwritten signature in polar coordinates having length and direction, $(r, \theta)$, to describe the movement of the pen in a sequence the ignature is written. The use of polar coordinates and having the magnitude of the polar coordinate being the abcissa and the direction the ordinate is most useful in this invention and is one of the steps of this invention which permits quantitative comparison of qualitative data. This effectively produces a continous history of pen movement as indicated by polar coordinates. The direction of the polar coordinate, $\theta$, is determined as the direction of movement from on equential point to another on the X-Y data tablet. The magnitude, r, is determined as the distance of one location to the next. In the embodiment described herein the polar coordinates are determined using an X-Y data tablet in conjunction with a look-up table as stored in the microprocessor memory. The polar coordinates could also be determined using numerous other techniques. It can be seen looking at FIGS. 4 and 5 that $\theta$ is determined from FIG. 5 and r is determined from FIG. 4 to make up the polar coordinate for each point of the waveform. The polar coordinate could be separately determined using different techniques if desired. This method of reducing handwritten signatures to data for comparison with other handwritten signatures is to be contrasted with numerous other techniques as a sequential continuous history of movement of the writing instrument.

Numerous other novel features of this invention are also used in combination with the waveform to produce a novel technique of quantitatively analyzing a handwritten signature.

An apparatus for carrying out this invention can be provided with a relatively inexpensive X-Y data tablet and a microprocessor chip with an appropriate output and memory. This is an extremely inexpensive implementation and yet is used in such a manner as to permit signature verification of many individuals.

It is an object of this invention to provide a method of verifying whether or not the same individual has signed two signatures which are provided.

It is a further object of this invention to provide a method of implementing a signature verification apparatus which is relatively inexpensive.

It is a further method of this invention to implement a signature verification method which is extremely quick and accurate.

It is a further object of this invention to provide data representative of an individual signature which is a one-dimensional array without time being a factor within the array.

BRIEF DESCRIPTION OF THE DRAWINGS

FIGS. 1a–b a reference signature with the respective reference waveform.

FIGS. 2a–b, show a signature written by the same individual at a later time with respective waveform.

FIGS. 3a–b illustrate a signature by a person other than the ref individual attempting to forge the referenced individual's name and the respective waveform of the attempted forgery.

FIG. 4 is a look-up table indicating the number of unit vectors which would represent the distance from a given point to a second point.

FIG. 5 is a look-up table which indicates the direcion of the vector between two points.

DETAILED DESCRIPTION OF THE INVENTION

Figure 1B:
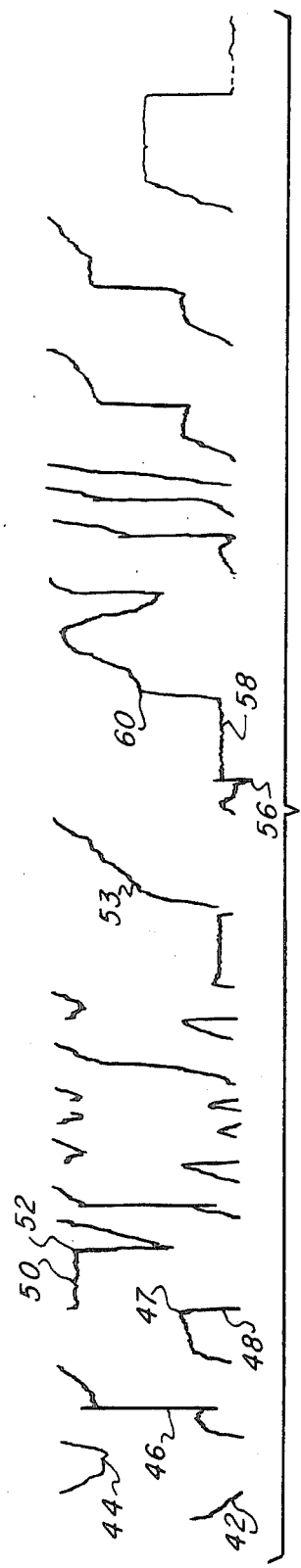

Disclosed is an apparatus and method for generating data from pen movements. The generated data is then used to provide a quantitative analysis of the pen movement. The data can be used in numerous applications. One application is in signature verification to determine if two signatures were made by the same individual as more fully discussed and claimed herein. An additional application is character recognition of handwritten text, both printed and cursive as described and claimed in TI-9218. An additional application is to provide a printing system which prints characters directly from handwritten text as claimed in TI-10204. The printer is particularly useful for Chinese and Japanese characters because this eliminates the need for a keyboard input and permits direc t printing of these complex handwritten characters.

An apparatus which could be used to perform signature verification is preferably comprised of an X-Y data tablet which provides an output indicating the X and Y location of a writing instrument on the tablet and a microprocessor or computer for analyzing the information from the data tablet. An X-Y data tablet is provided with five mil. resolution. The graphic tablet indicates the X and Y coordinate at which the pen is presently located and also indicates whether the pen is up from the paper or down on the paper. This type of data tablet is commonly available and the particular tablet used in one embodiment of this invention is a Demi-Pad 5tm manufactured by GTCO Corp. of Rockville, Maryland. The graphics tablet as used in this embodiment has a five mil. resolution, however, it is to be understood that any resolution may be used and a different resolution might be desirable depending on the particular use of this invention. The graphics table described herein also uses a wire connected to the pen to indicate whether the pen is up or down on the paper. It is to be understood that numerous different types of data tablets and writing instruments, refered to as pens herein, could be used and all that is necessary is an indication of the location of the pen on the paper. This may be done using a resistor array, a light sensor, an optical scanner magnetic wands or any other tablet and pen which may be used together to follow the motion of the pen as text is written.

The use of an X-Y data tablet is preferred in many instances because of the very low cost with which they can be provided. Additionally, the pressure sensitive X-Y data tablet described herein is sufficiently accurate and yet is very simple and has a minimum amount of hardware. In the embodiment described herein the hardware of the data tablet is performing very few of the functions required for signature verification. It may be possible to use a more elegant data tablet which provides directly the polar coordinates, provides data at set distances rather than on a clock pulse rate or other features which have been described herein as being performed by a microprocessor.

An X-Y data tablet of finer or coarser resolution could be used depending on the desired application. If the data tablet has finer resolution, for example, in the range of one mil, the waveform would be correspondingly more detailed and would more accurately represent the exact movement of the pen from one location to another. This would be in conjunction with the clock rate which samples the location of the pen. A coarser resolution may be desirable in some applications when as detailed a waveform is not required. It may also be desirable to use a data tablet with direct polar coordinates rather than using the microprocessor to perform polar coordinate conversion as will be described herein.

The X-Y data tablet provides an output at each clock pulse. The clock pulse for this embodiment is at approximately 90 Hz. This means that 90 times each second the data tablet the curren and Y location of the pen on the tablet if the pen is touching the tablet or else indicate that the pen is not touching the tablet by sending the appropriate data signal. When a person is writing very quickly across the page fewer data points will be received then if the same line were drawn very slowly across the page. The final result, however, would be two lines which are identical to each other without respect to the speed with which were written. The clock rate in combination with the resolution of the data tablet will determine the number of data points in the waveform. If the clock rate is extremely fast and a fine resolution is used a large number of data points will be determined while the pen is being moved on the paper. This will provide considerable more data points for comparison of the waveform with other waveforms. However, the comparisons will take much longer due to the larger number of data points. If the pen is not moving on the paper the location will not change from one clock pulse to the next and no data will be supplied to produce the waveform. This is because there will be no distance moved and no direction of movement which are the only two factors used in determining the waveform. The clock pulse rate may be slower to adapt to particular circumstances and for speed.

Data compression may also be desirable for specific applications. It is possible to represent several identical data points or number string comprised of many numbers by only a few numbers. It is also possible to decrease the clock rate in conjunction with data compression so that the waveform comparison may be performed more quickly.

The term "signature trace" as used herein refers to the course or path followed by the writing instrument as the signature is written. "Trace" has a standard meaning as defined by the dictionary.

The method of this invention will now be described. An overview of the steps used in this invention will now be given which may prove helpful in identifying which portions of the particular details fit at which point in the method. First, an individual provides a reference signature which is stored in a template memory as the ideal or reference signature of that individual. The signature is stored with the necessary identification as to which individual has signed that name. This may be stored on a magnetic card such as a common credit card rather than in a template memory. It is only necessary that the reference signature be provided to a microprocessor for comparison with specific individuals. If the reference signature was stored magnetically on a credit card the person putting the credit card into the machine would be required to match the reference signature on that credit card in order to continue use of the credit card service or banking machine. Alternatively, if the reference signature was stored on a template memory the person who is going to provide the sample signature will have the desired reference signature retrieved from the template memory.

A next step in the method of this invention is the providing of the sample signature. The sample signature is provided by the unknown individual who is attempting to sign the name which will match the desired reference signature. The waveform for the sample signature is then generated to a waveform using the techniques as more fully described herein.

When the pen is placed on the X-Y data tablet to begin writing the signature the X-Y data tablet sends the X and Y location of this point as the reference location. The X-Y data tablet continues to send the X and Y location of the pen as it moves across the data tablet at a predetermined clock pulse rate. As the pen moves to different locations on the X-Y data tablet the distance and direction of movement between sequential locations is determined. The distance and direction of movement is used to provide a waveform which is an indication of the path followed by a pen in making a signature. The abscissa of this waveform is cumulative path length and the ordinate is direction of movement. It is important to note that the waveform is specifically designed to remove the function of time from the data.

It is desirable to indicate the beginning and ending points of the signature. This can be done by the person providing the sample signature pressing an input key and at the next point at which the pen touches the pad will be indicated as the beginning of the signature. At the end of the signature a person may lift the pen from the data pad and place it at a particular location on the data pad to indicate the signature is over or alternatively press an end button to indicate that the end of the signature has been reached. The microprocessor can be programmed to ignore data points for any signal noise which is recieved after the signature is ended or prior to the signature being made.

After the waveform for the sample signature is determined the next step in this invention is the comparison of the two waveforms with each other. This is a quantitative comparison as more fully described herein with a numerical output as the result indicating the degree of similarity. Prior to making the quantitative comparison the waveforms are usually aligned with each other. It is, of course, possible to compare the waveform with no alignment whatsoever, however, the quantitative output will be somewhat different than those in which various alignment techniques were used.

Alignment techniques are described herein with considerable detail. Depending on the alignment technique which is used the quantitative comparison will be considerably different for the sample reference waveforms. The preferred alignment technique described herein uses dynamic programming which is a method by which an extremely large number of alignments are tested and the quantitative comparison made and then alternative alignments are made with quantitative comparisons and that alignment having the most favorable quantitative comparison is selected as described herein with respect to dynamic programming. The next step after performing the aligning using any one of the many techniques described herein is to perform the actual quantitative comparison. This is done by determining the integral of the difference between the waveforms in this embodiment and providing a number proportional to the average integral which is used to indicate indicating the similarity between the two waveforms. The next step in the method of this invention is to output whether or not the sample signature was made by the same person who produced the reference signature. This output provides the average integral between the waveforms and the relative data count between the two waveforms.

The data count is an indication of the speed with which the pen was moved as it was pressed against the paper. The combination of the integral score and the data count score is an indication as to whether or not the same person signed each of the names and is provided as the final output for this machine or in place thereof merely a "yes" or a "no" indicating that "yes" the person may proceed because the same person has provided both signatures or "no", the person may not proceed because the signatures do not match. The steps which have just been described will now be described with more particular detail.

WAVEFORMS

It is very common in handwritten text for different parts of each letter to be written at considerably different speeds. For example, the first part of a curve or a straight line down may be made very quickly and the transition from one letter to the next may be made at a much slower speed. Alternatively, different parts of the same letter may be made quickly as changes in directions are made or slowly for the same change of direction at a different part of the letter. This invention specifically overcomes the problems of writing the characters at different speeds as explained herein. The waveform will be identical for written signatures which follow the same path without respect to the speed. As can be seen by the description of the waveform herein the waveform is specifically designed to be identical in all respects whether the signature is written quickly or slowly. This is because the waveform is a combination of the path travelled and the direction of travel and is not determined using a function of time.

The function of time and the speed with which a signature is written for a different portion of this invention is determined independent of the waveform. As a signature is made the X-Y data tablet will provide a number of discrete data points which is a direct indication of the amount of time taken to sign the name while the pen was moving on the data tablet. If the pen is off of the data tablet or is stationary during clock pulses no new data points will be provided and this will not increase the data point count for that particular signature. In this way the number of data points is directly related to the speed at which the pen is moved across the data tablet while the signature is being made. It is not related to the amount of time while the pen is off of the data tablet. The number of data points received for the reference signature is determined and stored for use as described herein.

The method by which the waveform is determined will now be described with particular detail. The X-Y data tablet provides an output indicating the X and Y location of the pen at any point during which the other is being made. The microprocessor generates the polar coordinates of the pen from the rectangular coordinates as given by the data tablets. The polar coordinates are determined by placing the last location at the center and the next location with respect to a first location being the center as will now be described in particular detail. As the pen moves from one X and Y location to the next X and Y location a vector connecting those two points can be determined. The vector will have a magnitude and a direction. Because the X-Y data tablet used in this embodiment provides an output after certain time intervals the length of the vector will be directly related to the speed with which the pen moved. If the pen was moving very rapidly the two adjacent data points would be far apart on the XY graphics tablet, however, if the pen moves very slowly the locations may be adjacent squares on the X-Y data tablet. If there was no motion at all the data point will be the same and the XY graphics tablet will continue to provide the same X and Y locations for the pen each clock pulse until the pen is moved. The data output from the X-Y data tablet is made time independent.

The data output from the X-Y data tablet is made time independent in the following manner. FIG. 4 shows a chart with the beginning X and Y location at the center square. Squares which are considered to be one vector length away are labeled with one. Squares of two, three, four and etc. unit vectors away are labeled accordingly. A unit vector is defined in this example as the distance across one square of the graphics tablet. It can be seen that a diagonal movement across a square will be longer than a horizontal or vertical movement across the square. Each square in FIG. 4 is individually labeled to represent the number of unit vectors from the center square to that square. The data from the X-Y graphics tablet is fed to a microprocessor or in the alternative to a large computer for processing of the data.

One embodiment uses look-up tables to determine the length of the vector between location and the direction of the vector. This has been found to be an efficient way to quickly determine the length and direcion of the vector betwen the points. It is possible to determine the waveform using only look-up tables or using other methods to determine vector directions and lengths, as is well known.

Figure 9A:
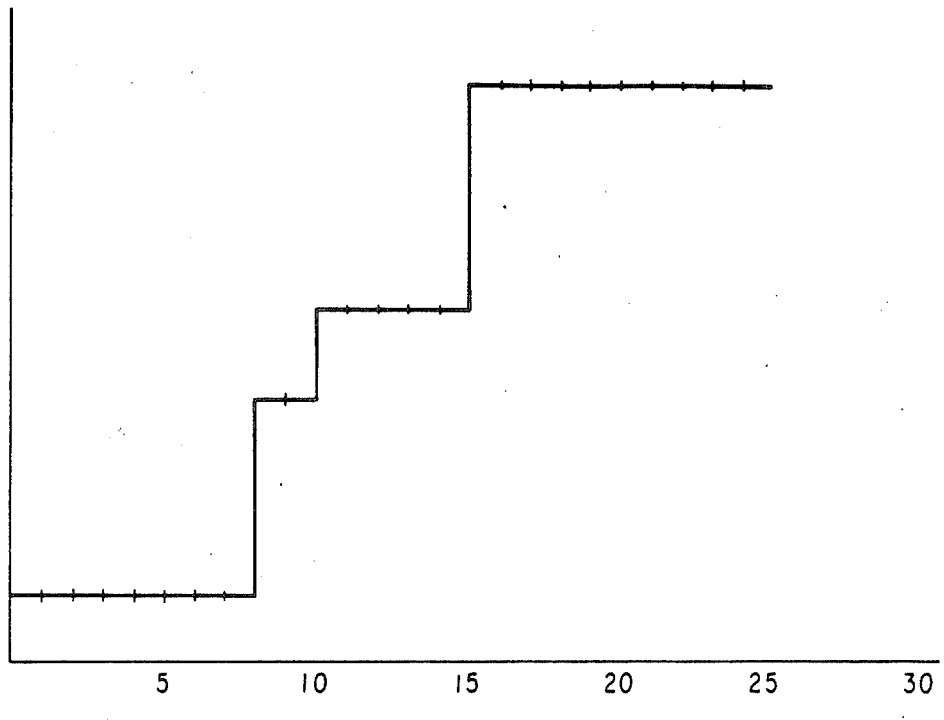
FIGS. 9a–b show an example of producing a waveform from handwritten text.
Figure 9B:
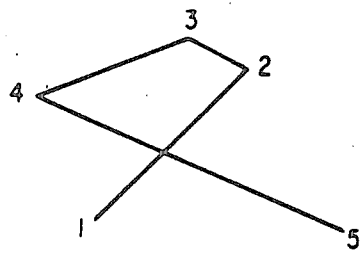

The table of FIG. 4 is stored in memory available to the microprocessor for access as data points are read. When the microprocessor receives the second data point it locates that square on the grid shown on FIG. 4 for which the second point corresponds using the first point as the center. When this point is located the microprocessor then determines the number of unit vectors which correspond with the number which would reach the partcular square. For example, if the reference location one were at the center and the next location were to the right six squares and up five squares this would correspond to an eight being in that square on FIG. 4. The microprocessor would then produce a number string comprised of eight unit vectors having equal magnitude and all having equal direction so that the addition of these vectors would provide a result from point one to point two on FIG. 4. This is illustrated in FIGS. 9a–b. It can be seen that in this embodiment the microprocessor not actually determine the vectors and their directions. The microprocessor merely counts the number of squares in the X direction and the number of squares in the Y direction which represents the difference between the reference location and the next location. The microprocessor then addresses the appropriate portion of the look-up table in memory to determine the number of unit vectors which would be the distance corresponding to this X and Y location from the reference location.

The microprocessor must then determine a direction of the vectors. In the example given wherein the second square is six to the right and five up from the first square the direction of the vectors is 28 as shown in FIG. 5. FIG. 5 shows the table which may be stored in memory available to the microprocessor having the directions for all possible directions stored therein as a look-up table. This provides fast access by the microprocessor and an easy way to determine the direction of the unit vectors. The microprocessor will therefore give each of the eight vectors a magnitude of one and a direction of 28. It can be seen from FIG. 5 that the number of directions goes from zero to 255. Zero is represented as being due east, 64 as north, 128 as west and 192 as south. The use of 256 units to a circle was selected with digital prooessing in mind, however, the invention could be just as easily carried out using 360 units, 512 units or any other convenient number. It has been found that the use of 256 units is sufficiently detailed to provide the desired waveforms. This process is a rectangular to polar coordinate conversion.

The microprocessor has now determined a portion of the waveform of a handwritten text which is independent of time, that is, the speed with which it was written. The waveform from the example given would result in a straight line eight units long at exactly 28. This is a single number string made up of eight numbers. The number of units, which in this example is eight, represents the distance between the two points and not the speed with which they were drawn. If the first point had been produced by placing the pen at the reference location and then lifting the pen off of the data tablet for a few moments then placing the pen down at the next location the digital waveform would look identical to drawing a line to this data point. The total distance moved is eight units and the direction of movement is 28. Without respect to the movement of the pen in between the determination of data points.

As has been stated herein data points are determined at a clock pulse rate. The location of the pen on the clock pulse will be the only data used in composing the waveform. The movement of the pen in between clock pulses will not be reflected. However, it is to be understood that in this embodiment the clock pulses are sufficiently fast that locations are often determined for adjacent squares. Accordingly, the path of the pen will be important because the clock rate is so high that the entire path of the pen will be traced from one square to the next. However, if the clock rate is made slower or the pen is moved extremely fast it is possible for the pen to travel a path other than a straight line betwee sequentially determined data points.

This becomes apparent and particularly useful when the pen is lifted off of the tablet dotting an i or crossing a t. The time for which the pen is off the data tablet will not be counted and no data points will be provided. Therefore, the last data point when the pen left the tablet and the location of the next data point when the pen first touches the tablet will be independent of the paths followed by the pen while up in the air. It will also be independent of the amount of time taken to move from one location to another. It will be directly related to the distance between the two points and the direction of movement from one point to the next the two points on the data tablet. This is been found to be a particularly effective technique for signature verification. An individual almost always signs his signature with exactly the same order of crossing t's and dotting i's. Furthermore, the movement from one part of the signature to begin to cross the t and dot the i is always uniform within the person and will be uniform in direction and in relationship of length to the whole of the signature. This particular feature is extremely difficult to forge. If an attempted forger dots the i or crosses the t in any different order the waveforms will be significantly different because the waveform is particularly sensitive to the order in which these functions occur due to the waveform being constructed from sequentially determined data points on the paper.

Referring now to the two locations as previously stated it can be seen that the waveform of these two points would be represented by drawing a horizontal line eight units long approximately between north and east at exactly a 28 direction mark as shown in FIG. 9a. FIG. 9a shows east is a zero unit, north is at 64, therefore these two points could be represented by drawing a horizontal line eight units long approximately halfway between north and east at exactly a 28 direction mark. A number string as used herein refers to those data numbers generated to represented movement from one location to the sequentially adjacent location.

When the pen moves to a third data point the second data point is referenced as though it were the center of the block of the squares shown in FIG. 4 and 5. For example, if the next data point were two to the left and one up from the data point located at 28 in the prior example this would be represented as two unit vectors having equal length and a direction of 109. As can be seen from FIG. 5 this direction of 109 is determined by placing the most recent data point at the center of FIG. 5 and then determining the relationship between the next data point and the prior data point and if the prior data point were at the center of FIG. 5.

The determination of a portion of the waveform is shown in FIG. 9a. The chart shown in FIG. 5 is used to determine the direction of the unit vectors for sequentially located data points. After the unit vectors are determined they will be added one at a time as shown in FIG. 9a to determine a waveform. For example, if the fourth point located as the signature was written were five to the left and two down from point three as shown in FIG. 9b this would have a direction of 144. The direction of 144 can be determined by using point three as the center square in FIG. 5 and moving left in the X direction five and down in the Y direction two to reach the square 144. The length of the distance between points three and four in unit vectors can be determined from FIG. 4 by going five to the left in the X direction and two in the Y direction and the number five in this square indicates that there are five unit vectors between points three and four. Therefore a number string of five numbers would be generated. The waveform in FIG. 9a illustrates the movement of the pen from three to four by drawing a path length which is five units long at a direction of 144. The next point located is the signature written shown as point five in FIG. 9b. This point is ten points to the right in the X direction and four points down in the Y direction from point four. When FIGS. 5 and 4 are used to determine the number of unit vectors and the direction the distance between points four and five is so great that the look-up tables do not allow this determination.

In determining the waveform between points four and five the path length is broken into two vectors having an approximately equal length the result will be one vector between points four and five. In the example given this could be accomplished by using two vectors each five units to the right on the X direction and two units down on the Y direction. A vector of this length can be found on FIG. 5 having the direction of 240. FIG. 4 shows that the path length is equal to five unit vectors for the vector between point four and the halfway point and is also equal to five unit vectors for the path length between the halfway point in point five. The waveform produced from this line drawn from point four to point five is shown illustrated in FIG. 9a.

The movement of a writing instrument as described and shown in FIG. 9b would produce the waveform as described and shown in FIG. 9a. As clearly illustrated on FIG. 9a the path length is the abcissa and the direction is the ordinate. It is to be understood that the waveform of 9a is greatly exaggerated and is an expanded version of the waveform which would normally be produced by a writing instrument. The resolution of the X-Y data tablet will be sufficiently great that there will not be many sharp steps of significant direction changes unless there is an extremely sharp change of direction. Handwriting of an individual is usually much smoother than that shown in FIG. 9b and the digital waveform produced thereby would be correspondingly smoother and have fewer distinct steps. However, in any handwriting when a sudden change in direction occurs, especially a complete reversal of direction the digital waveform will reflect the sudden change of direction with the step increase or decrease from one direction to the next.

If the pen is moved very quickly or is off the paper between points it is possible for adjacent located points to be further than a threshold number of unit vectors apart. This is because the location is sampled at a constant clock rate to determine the location of the pen and movement greater than the threshold number of unit vectors during the time interval would place the pen outside the look-up table which has been provided in FIG. 4. As can be seen on FIG. 4 the threshold value that would require splitting of the vector is nine but may be as high as 13 depending on the direction. The vector is too large if the second location of the pen would not be shown by FIG. 4 by placing the first location at the center. When this occurs the microprocessor automatically splits the vector into two or more equal vectors each of which is less than the threshold value of unit vectors from the prior adjacent point and the sum of which is equal to the original single vector. Each of the two vectors are then analyzed in the described fashion to determine the appropriate unit vectors and their direction and are made part of the vector sum to determine the waveform.

Figure 2B:
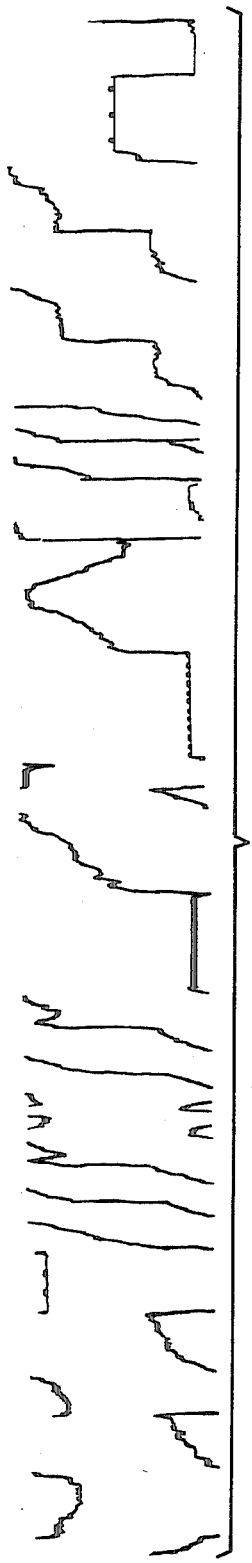
Figure 3B:
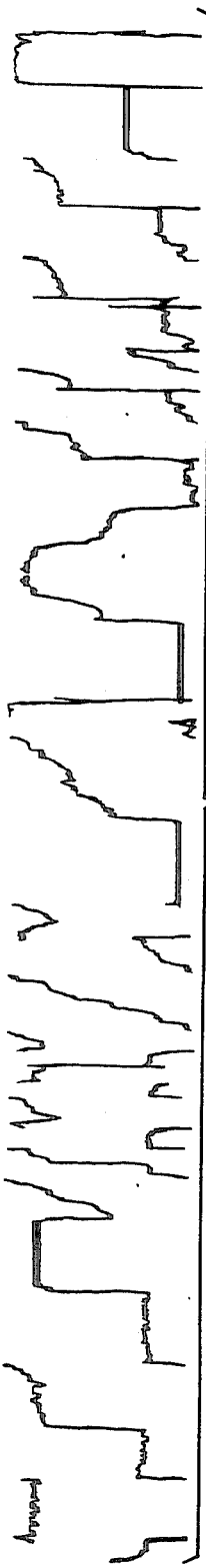

Examples of waveforms are shown in FIGS. 1b, 2b and 3b. These waveforms were produced on a plotter to illustrate the digital waveforms used as produced by the microprocessor in this invention. As can be seen, when the same direction is maintained for a great path length a straight, horizontal line is produced in the waveform. When the pen is raised from the paper and then put down at a new location the microprocessor treats these as two adjacent locations and computes the waveform in the described manner. This will be illustrated in the waveform as a horizontal line representing the distance between the two points in the direction a vector between the the two points would have. When the direction of motion is sharply changed a straight vertical line results as shown in the digital waveforms. It is to be understood that the digital waveforms illustrated in the figures, including FIGS. 6a-c, 7a-d and 9a are greatly enlarged to show particular details and to make understanding of the waveform and comparison techniques easier.

The determination of a waveform from a signature can be seen by comparing the example given in FIGS. 1a and 1b. FIG. 1b represents a waveform produced from the signature made in FIG. 1a. At the start of the W the pen begins a movement in the direction of approximately 40 as shown by FIG. 5 and continues to curve around to the top of the first curve in the letter W until it moving in direction of exactly zero. This is shown as the waveform in FIG. 1b passes through zero at point 42. The pen continues to move along the paper until it reaches the first vertical portion of the letter W and moves straight down in making this letter. This vertical movement has a direction of approximately 192 and continues for a specific distance during a plurality of clock pulse rates as represented by the horizontal line 44 in FIG. 1b. A horizontal line in FIG. 1b is an indication that the pen move the same direction for a specific distance. It can be seen that the abcissa is distance moved by the writing instrument and the ordinate is direction of movement. There is no indication of time in the waveform. The W is formed by curving across the bottom and going through zero again reaching the top of the center of the letter W and then suddenly reversing direction to go straight down in the middle of the W. This sudden reversal of direction is illustrated as line 46 in the waveform of FIG. 1b. This is a vertical line illustrating a sudden jump from one direction to another due to the reversal of direction. After the sudden reversal of direction the rest of the letter W is formed and then passes through the zero direction and wraps around the waveform as shown in FIG. 1b. The end of the letter W is shown as 47 on FIG. 1b.

The pen is then lifted from the paper and moved in the air to begin making the a in Warner. When the pen reappears at the top of the letter a this is shown as 52 in the waveform of FIG. 1b. The horizontal line 50 represents the direction of movement from the top of the W to the top and beginning point on the a. The line is horizontal indicating that the direction of motion was unchanged for a certain distance. It can be seen that the waveform reflects the pen movement from one portion of the signature to another even though the pen is off the paper. The waveform uses the last location on the W as the first point and the first location on the a as the next point to determine the movement of the pen from one point to the next on the data tablet. The waveform is then generated by determining unit vectors to that distance and the direction of movement between the two locations. No data points are generated while the pen is off the paper. It can be seen that the waveform would be identical if the pen were left on the paper and moved in a uniform direction from the top of the W to the beginning of the letter a. In this respect the directional relationship from one letter to another with the pen off the page in between them is extremely important. The relative relationship between sequentially located points on the data tablet is determinative of the direction of the horizontal line. The direction of motion from the top of the W to the beginning of the a is approximately 230 as can be seen in FIGS. 5 FIG. 1b. If this direction of motion were slightly offset the horizontal line may be the same distance in length but the direction of motion would be considerably different and would be reflected by an increased integral of the area between the waveform as will be described herein.

The remainder of the word Warner is written and produces the waveform as shown in FIG. 1b. The pen is then lifted from the page and the letter C is made as indicated by the slanting line 53. After the letter C has been made the "." behind the initial C is made as represented by 56 in FIG. 1b. The length of the horizontal line just prior to 56 is an indication of the distance between the C and the ".". The pen is then again lifted from the paper and moved to begin making a letter S. When the pen is placed on the paper to begin making a letter S this is indicated as 60 in FIG. 1b. The direction of motion from the "." to the top of the S is at a direction of approximately 30 and is horizontal for a specific distance as shown by line 58. When the pen touches the paper to begin making the S the direction of travel is reversed as indicated by the vertical lines between the horizontal line 58 and point 60. The remainder of the word Scott is then written as shown by the waveform.

The order in which the person signing their name dots the i's, crosses t's, etc. is crucial in forming the waveform as can be seen from this example. For example, if the "." after the letter C had been made at the end of that entire signature this would considerably change the waveform. Even though the final signature may look identical after it is written. If the "." were placed after the word Scott had been written this would be represented by a relatively long horizontal line representative of the distance from the end of the word Scott to the point of the initial behind the letter C at the end of the waveform. This would be extremely long distance with respect to the rest of the waveform and produce such an alteration of the waveform that it could not be forged by anyone unless the same pen stroke were followed. Even if the exact pen stroke is followed as will be further explained with respect to FIG. 3b the score will still likely be considerably higher than a passing score. Similarly, if the t's of Scott had been crossed at a different time or a different order the waveform would be considerably different because the movement of the pen from one location to the other would be different. This is not reflected by time but rather by movement of the pen from one location to another.

The wrap-around features of the waveform can be seen by looking at FIG. 1b. As the waveform is formed at 42 and the pen continues to move through zero the direction goes from zero to a large number in the range of 250 so the waveform is wrapped around the bottom as shown in FIG. 1b. The vertical line 46 represents the reversal of direction at the middle of the W as explained and is not drawn as being wrapped around the waveform, however, in FIG. 2b the same W is shown going through zero and wrapping around the waveform at that particular point. This has an identical result with respect to the microprocessor. Considerable differences appear to exist between FIGS. 1b and 2b because of the direction of wrap-around at different points in the waveform. This does not alter the results the comparison steps because the absolute value of the differences used due to this wrap-around feature.

Methods of Comparison and Alignment

There are numerous techniques by which the two waveforms may be aligned and compared with each other on a quantitative basis. Qualitative features of the handwritten text are provided in the waveforms to permit quantitative comparisons. Numerous techniques will now be described to achieve alignment for this quantitative comparison to provide a number output indicating the degree of match between two waveforms. It is to be understood that any of these techniques of aligning two waveforms could be used depending on the desired application. It can also be seen that some alignment and comparison techniques are much quicker than others while some techniques are more precise and yield a better quantitative comparison of the waveforms.

Figure 6A:
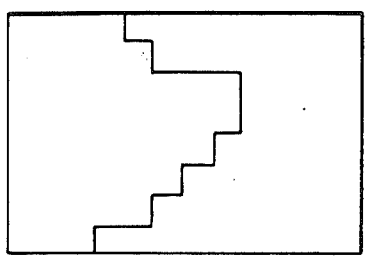
FIG. 6a–c illustrae size normalization of two waveforms with each other.
Figure 6B:
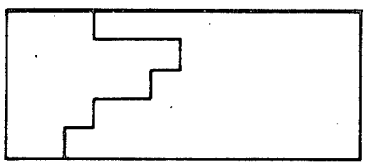
Figure 6C:
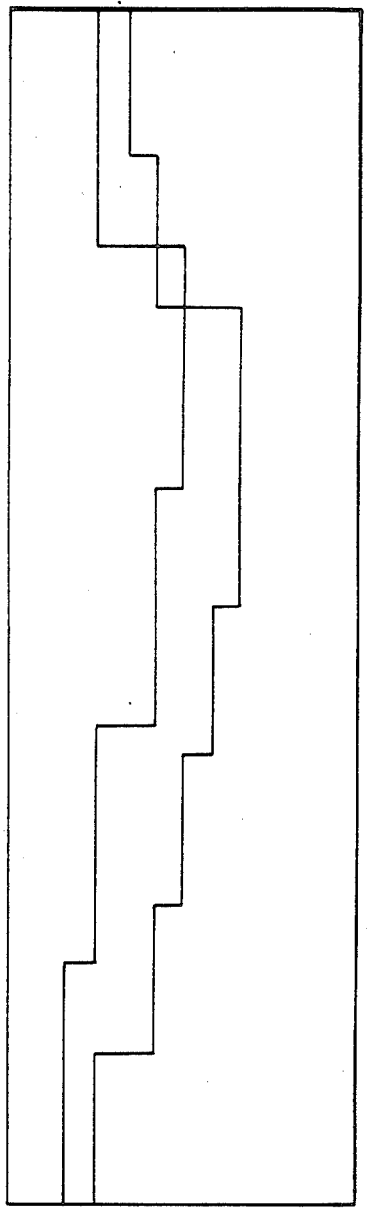
Figure 7A:
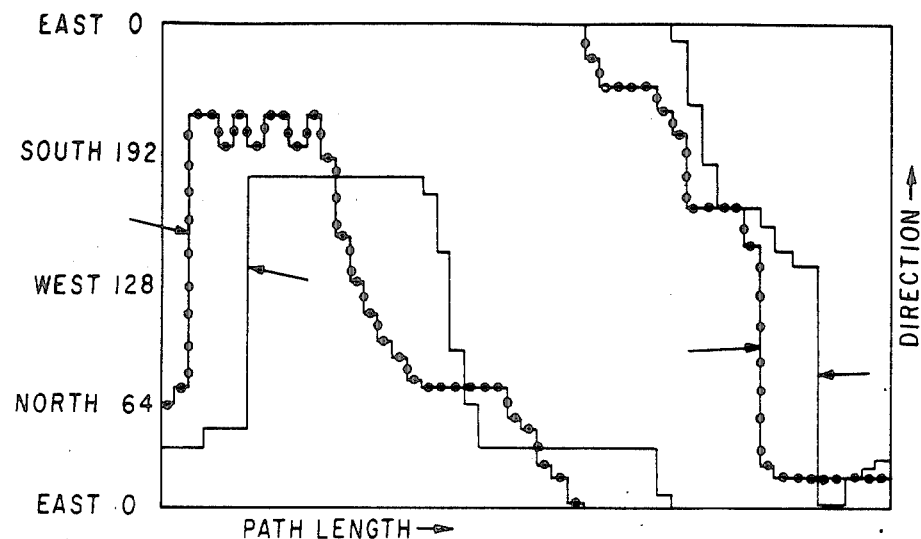
FIGS. 7a–d represents one method of aligning waveforms of two signatures for comparison.
Figure 7B:
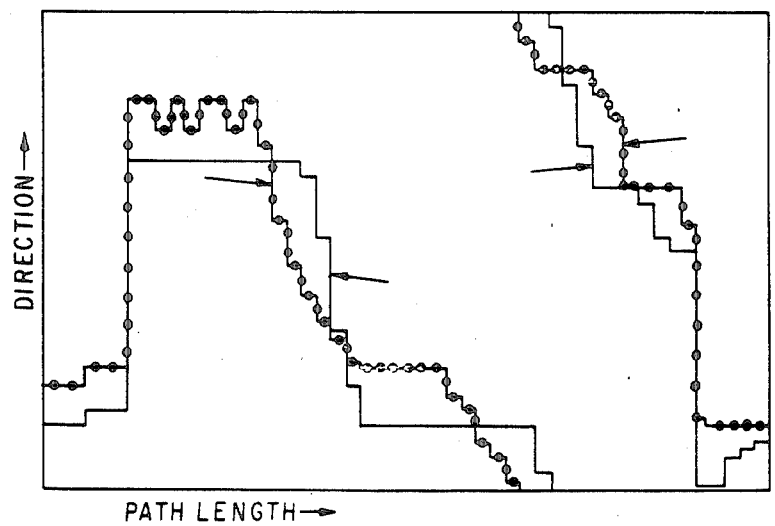
Figure 7C:
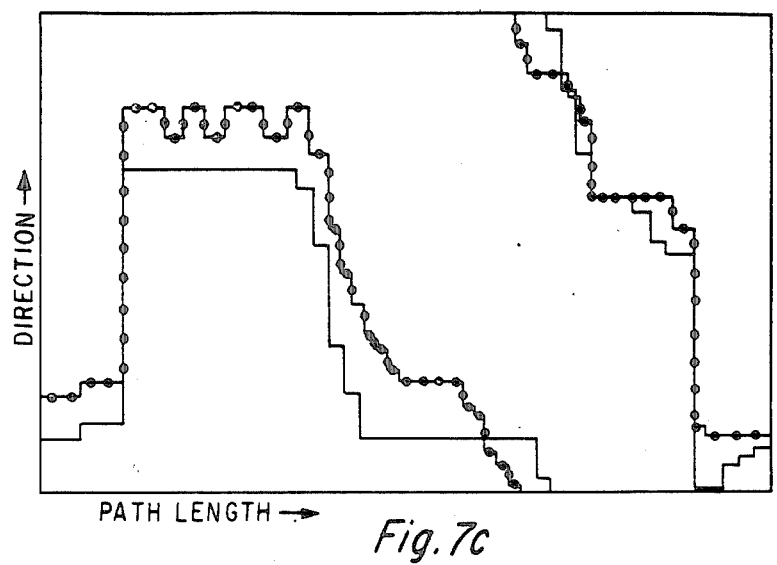
Figure 7D:
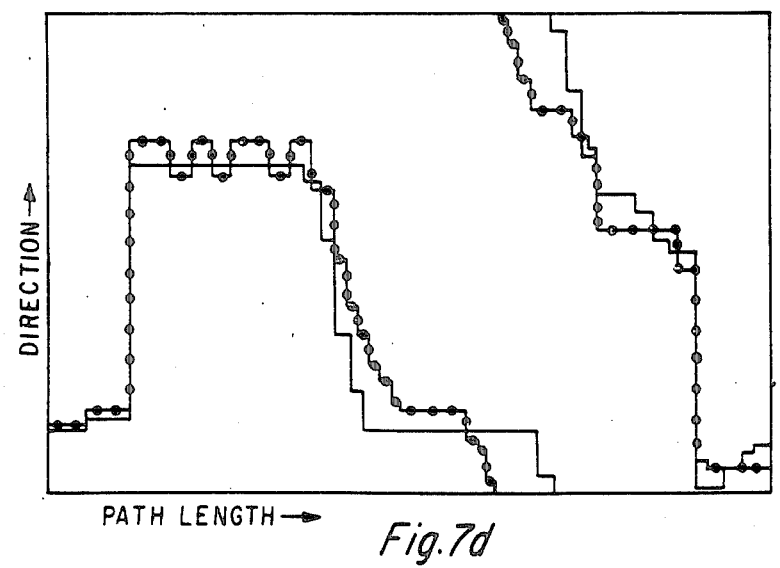

One way that quantitative comparison for producing an output for matching of digital waveforms could be performed is the following. The digital waveforms are superimposed on each other as shown in FIGS. 6c and 7d after the desired alignment has been performed as described more fully herein with respect to alignments. The microprocessor determines the difference by determining the area between the waveforms. This area will always be an absolute value and represent the of the difference between the two digital waveforms. The area is integrated from the start of the waveform to the finish. The integral of the area between the curves is directly related to the degree of match between the two waveforms. If the waveforms were perfectly matched the area between the two digital waveforms would be zero. If the waveforms were exactly opposite in direction the average area between the two curves would be 128. It should be noted that the difference between zero and 250 is six and not 250. This is because absolute values of differences are used and also the digital waveform wraps around as can be seen by the illustrations.

The integral of the area or a number proportional to the area between the two digital waveforms will be provided as an output to indicate the score for the comparison of those two digital waveforms. As can be seen if the integral is relatively low the waveforms will be considered as matching. Additionally when the score, as represented by the integral of the area between the digital waveforms is high the waveforms will be considered as not matching and not representing the same person signing the signature.

Prior to performing a comparison step it might be desirable to align the waveforms with each other. There are numerous methods of aligning a waveform prior to performing a comparison step. Some methods by which the waveforms may be aligned with each other will be described herein with particular detail. After or during the aligning steps the waveforms are then compared with each other to determine the degree of match between the two. The method of comparison which has been described herein as the preferred embodiment is the determining of the integral of the area between the two digital waveforms.

One method of alignment is no alignment at all, that is, simply superimpose the waveforms on top of each other exactly as the signatures are written and determine the integral of the difference between the waveforms. This particular method of alignment would make no provisions for differences in size of the entire signature. Furthermore, this method of alignment would not correct for differences in length between the two signatures. This method of alignment may be very useful, however, in certain applications. If the person signing the name always makes their signature very nearly the same length without regard to the size of space allowed to write the signature and always makes the characters the same size with similar patterns this could be an acceptable way to align waveforms for comparisons with this type of signature. In this respect a signature which was very similar including overall length, height, space in between parts of the name, individual letter size and other features would receive a very low score and be indicated as pass wherein a very similarly written signature which was somewhat differing in size, space or other dimension features would receive a very high score and would be indicated as not passing. There may be numerous instances when this type of alignment may be most desirable. This would be especially sensitive to any variations in the signature. This method of alignment using no relative alignment whatsoever may be desirable for those individuals who always write their name exactly the same with no variations of any type. It may also be useful when a box is given and the signature must fit the box exactly and not be too large nor too small and must begin and end at certain points in the box. In this way the signature would in effect be aligned and size normalized prior to or while being written rather than by preprocessing techniques after being written.

Another method of alignment which may be used would be to size normalize only the overall waveforms to each other prior to performing a comparison step. This effectively aligns only the beginning and ending points of the waveforms so that the variations of physical dimensions of the signature could be more easily tolerated. According to this method of alignment only the beginning and ending points of this signature are aligned with each other and all points in between are size normalized.

The two waveforms are compared at their starting points and at the ending points and are size normalized at a point in between ignoring the absolute lengths of the waveforms involved. One method by which this may be accomplished is the use of least common denomonator as shown in FIG. 6. As shown in FIG. 6a, a waveform having five data points is to be compared with a waveform having eight data points. One method of size normalization is to multiply the waveform having five data points by eight and the waveform having eight data points by five so that each will have a uniform length of 40 as illustrated in FIG. 6c. This also results in changing the size of the individual legs of each of the waveforms as can be seen in FIG. 6c. The waveform having only five data points has legs which are correspondingly longer than those of FIG. 6b over which it is superimposed as shown in FIG. 6c. This is one method by which the overall lengths may be sized normalized for comparison. After the overall lengths are size normalized the legs will most likely be different lengths.

The alignment of different legs and size normalizing them one at a time to the waveform is described in conjunction with other alignment techniques. When any leg is size normalized to another the least common denominator approach may be used with any segment or any portion thereof.

This is a slightly more "forgiving" alignment technique than the first technique described herein in that the same person could write their signature slightly different sizes and still receive a low or passing score.

It is important to note that individual portions of the waveform will be enlarged or made smaller relative to the other so that a one inch movement on one signature may be identical to a one-half inch movement on another signature. This may be desirable in some instances but may also be the cause of considerable differences when the quantitative comparison is performed because the data points no longer represent similar distances in the handwritten signatures. This method of aligning is also extremely sensitive and only slightly better than no alignment whatsoever. As a general rule much more detailed alignment techniques will be desired. However, the variations within the character and space within the signature would have to be almost identical with each signature if it were to receive a passing score. This technique may prove most useful in many applications where some variation by the individual may be allowed but the variation would only be very slight. This would still require the individual to make an almost identical signature each time his signature is written.

An alternative method of aligning the waveforms with each other along the beginning and ending points that size normalizes them to each other and then aligns individual legs within the waveform to each other and then further size normalizes legs to each other will now be described.

This method uses primary and secondary buoys to align individual legs within the waveform. As shown in FIG. 7a a primary buoy is located where the largest abrupt change in each of the waveforms occurs. The location of this abrupt change is determined by taking the derivative of the waveform. The largest derivative which has the greatest step change of each of the waveforms is termed the primary buoy. The primary buoy of each of the waveforms is determined and then the microprocessor checks to see if the primary buoys can be aligned with each other. If the primary buoys of each of the waveforms are within a predetermined number of points the two waveforms will be aligned at this point and the portions, that is, the legs on either side will be size normalized accordingly. FIG. 7a shows that the first primary buoy is within the described distance for each of the waveforms and they are aligned with each other. This results as shown in FIG. 7b in the lengthening of the first leg of the test character as represented by the dotted line so that the individual legs as buoy aligned are size normalized to each other. FIG. 7a shows a determination of a subsequent major buoy representing an abrupt change. This is also aligned with that portion of the waveform which represents a similar abrupt change and is in the same general area of the waveform on both of the waveforms.

The method of locating buoys has been described herein and is determining the derivative of the waveform, however it is to be understood that other methods of determining buoys could be used. The general thrust of the invention is to determine abrupt changes of direction as the writing instrument is moved in writing the signature. Rather than using the derivative the microprocessor could use numerous alternative techniques. For example, step increases or decreases in the direction, the amount of step change in direction, or other points on the waveforms could be tested for alignment techniques. The determination of the derivative as described herein is only one of the many possible ways to select buoys or alignment points for the waveforms. The derivative has been found to be a very useful technique in practice.

If the two most abrupt changes in the waveforms are located a great distance apart they will not be aligned with each other, rather the closest abrupt change within a threshold value will be aligned with a corresponding abrupt change of the waveform. For example, if the threshold value were set at ten data points, the maximum abrupt changes in waveforms within ten data points would be aligned to each other. This would result in primary buoys being aligned somewhere within ten data points along the entire length of the waveforms representing the signatures. The aligning of secondary buoys continues as shown in FIG. 7b, aligning the next largest abrupt changes in the waveforms with each other which are located within the threshold value of each of the waveforms. FIG. 7c illustrates the completion of the aligning of buoys to the desired point. The aligning of only four buoys is illustrated, however, it is to be understood that any greater or fewer number of buoys could be used depending on the desired application.

Using this method of alignment it is desirable to align only major buoys with each other and only those buoys which are at approximately the same location in each of the digital waveforms so as to maintain major differences between the waveforms. FIG. 7d can then be quantitatively analyzed to determine the integral of the area between the waveforms and provide it as an output as an indication of the similarity between waveforms. As can be seen, major portions of the waveforms are similar to each other but other portions of the waveform have significant area between the two waveforms. A score would then be given as a result of the comparison of the template waveform with the text waveform to determine if the two signatures are the same. If the score is greater than a threshold value the signatures can be determined as not matching or if less than a threshold value the signatures can be determined as matching.

The method of alignment using primary buoys prior to the comparison step is much more detailed and results in a better score than the prior methods described. This method is more "forgiving" of differences in character size within a signature and other dimensional problems. In some applications this could be the desired method of alignment. This method of alignment still requires that the signatures be quite similar before a low, passing score is indicated. signatures is to be contrasted with numerous other techniques in the prior art which do not make use of polar coordinates as a sequential continuous history of movement of the writing instrument.

Figure 8A:
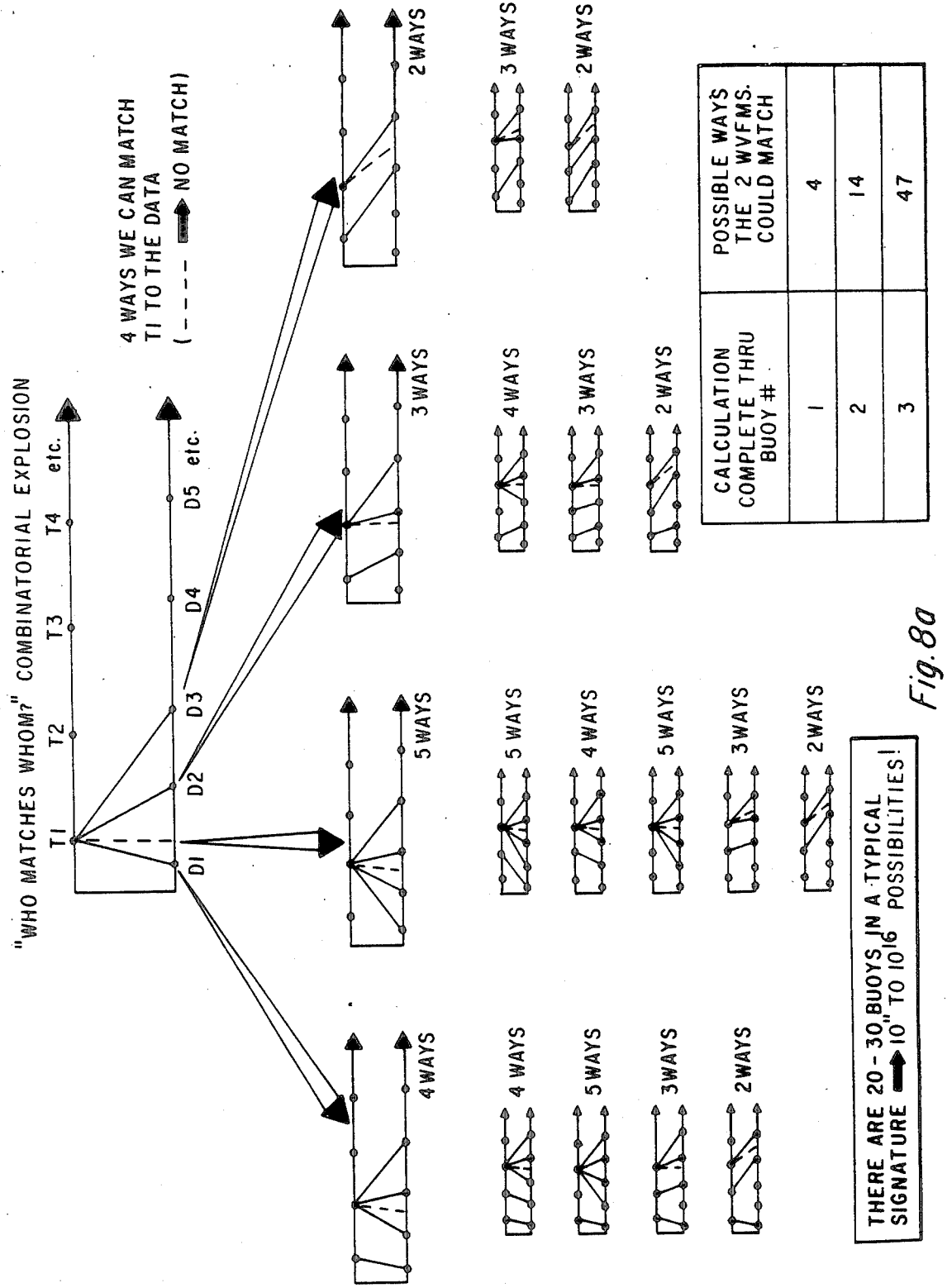
FIGS. 8a–c represent a second embodiment for aligning digital waveforms of two signatures and the use of dynamic programming to aid in the aligning of the waveforms.
Figure 8B:
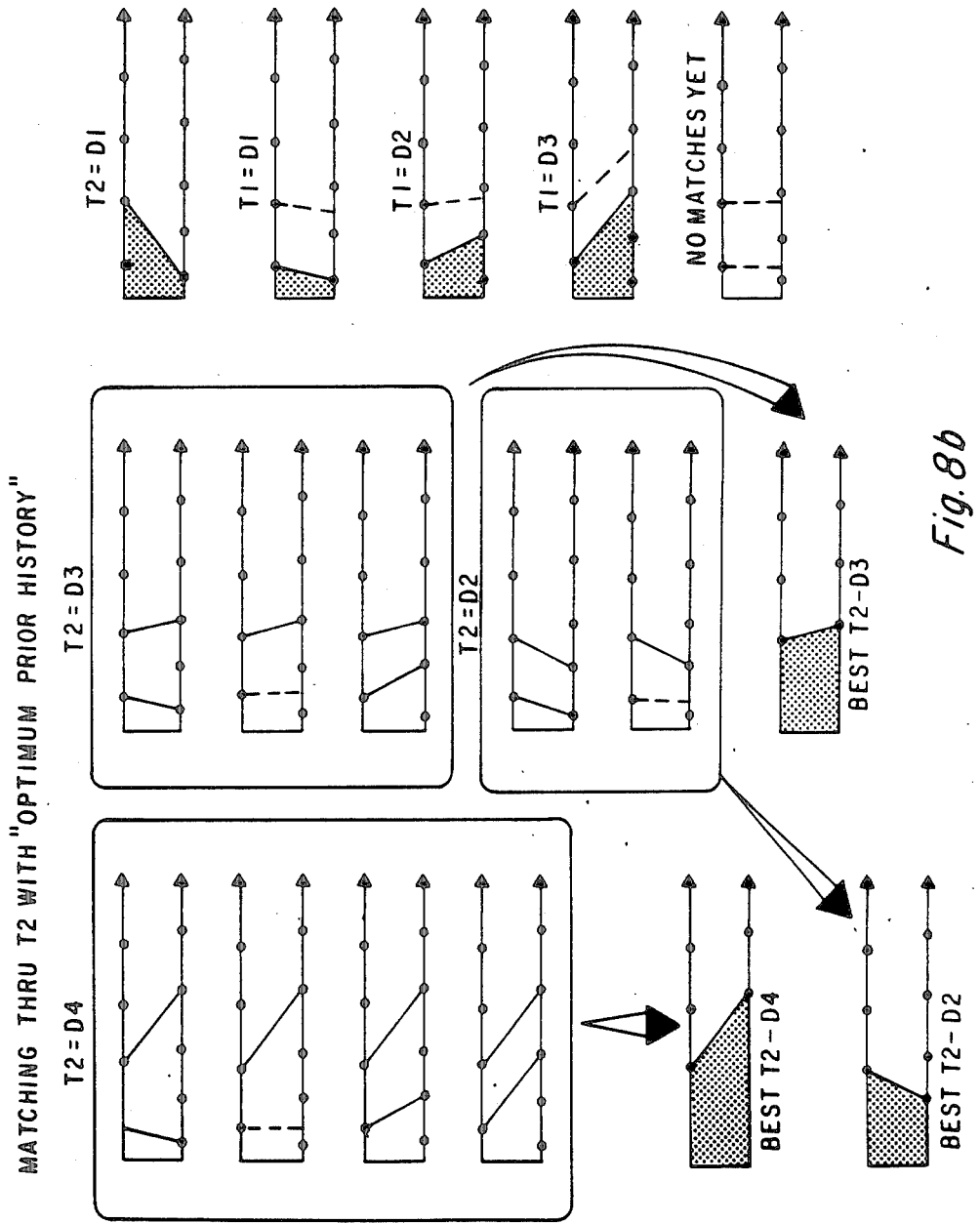
Figure 8C:
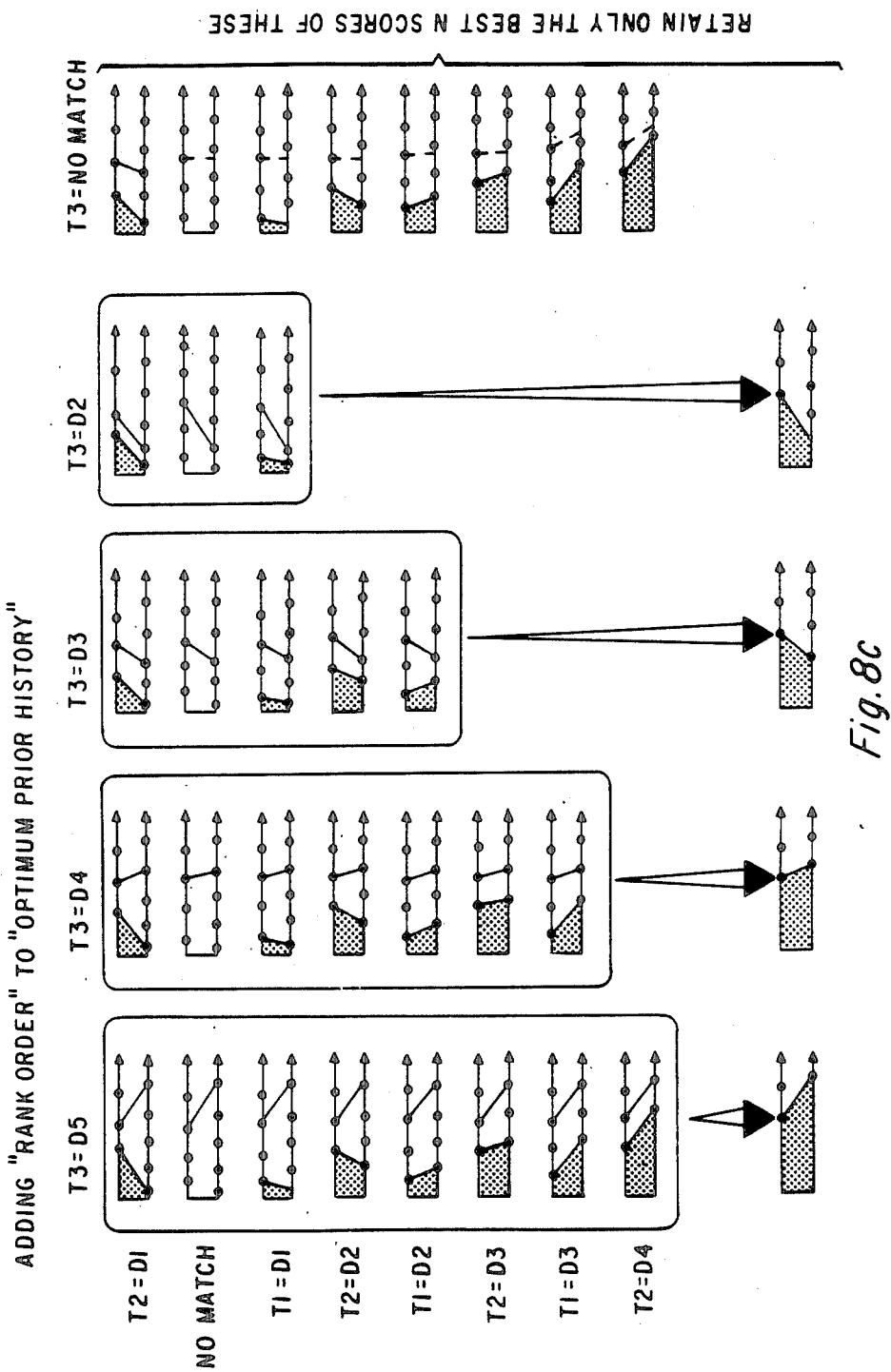

A comprehensive and detailed method may also be used to perform alignment of the test signature's waveform to the reference signature's waveform. This is the preferred method in most applications. The technique which has been found particularly useful is to adapt a form of dynamic programming to perform the comparison step. FIGS. 8a and 8b-c illustrate the use of dynamic programming techniques to perform the comparison step.

The method of matching buoys as illustrated in FIG. 8a shows the template as the top line and the location of the buoys as T1, T2, T3 and etc. The data is shown as the bottom line and the location of the respective buoys as D1, D2, D3 and etc. It is desirable to match correctly every single buoy of each waveform with each other. One method not illustrated by which these could be correctly aligned without dynamic programming is to align each of the buoys in the template waveform with each buoy in the data waveform and determine the integral for the waveforms for each of the individual alignments and select that alignment having the lowest integral. This would be equivalent to size normalizing every single portion within the buoys of the waveforms to each other, performing the integral for each possible alignment and selecting the lowest integral. A typical waveform has between 20 and 30 buoys therefore there would be about 2030 possible alignments and integrations. This number is so large as to take excessive amounts of computer time. This method of alignment is very good but too time consuming. A time saving method using dynamic programming techniques to achieve the same result will now be described.

One method by which the number of comparisons for alignment can be limited is by aligning only buoys within N data points of each other. In the embodiment shown in FIGS. 8a-c, N permits the comparison of four buoys. It is to be understood that N could equal any number from one up to any desired number depending on the time allowed. It is possible for there to be a large number of buoys, for example, in excess of ten within the predetermined number of data points which will permit alignment for comparison and determination of integrals of each other. Conversely, it is possible for there to be no buoy at all in the adjacent data points as established by N. If there are no buoys within N data points the buoy of the template data will be considered as not a possible alignment at all with a buoy of the sample data and an integral for only that one possible alignment with no buoys will be determined.

It is also possible to determine the number of alignments for comparisons according to a threshold number of adjacent buoys. For example, the adjacent N buoys of the template waveform buoys could be aligned without regard to their distance from the respective data buoy. This may be a desirable technique of buoy alignment in some applications. Numerous other techniques for buoy alignments could also be performed and an exhaustive description is not attempted herein.

Buoys are determined according to this method of alignment by taking the derivative of the entire waveforms of the template and the data. Those points on the waveforms having a derivative greater than a given threshold value will be designated as buoys without regard to primary, secondary buoys and will not be classed according to magnitude. It is important to note that relative magnitude comparisons between buoys is not done. Those portions of the waveform which are less than the threshold value will not be designated as buoys.

The threshold value can be set to determine any desired number of buoys and it has been found that between 15 and 30 buoys is a desirable number for many applications. If the derivative determined for any of the waveforms is greater than the desired number, for example, 30 the threshold value will be raised to a higher value. The derivative will then be compared with the now increased threshold value and the buoy locations determined again for each of the two waveforms. This will result in correspondingly fewer buoys and will lower the number below the desired value. Alternatively, if fewer than a minimum number of buoys, for example, 15 are determined the threshold value can be lowered so that a greater number of buoys will be determined at new locations whose derivatives are greater than the lowered threshold value.

FIG. 8a shows the first buoy of the template data designated as T1 aligned with adjacent buoys of the data waveform. T1 is shown having four possible ways to be aligned with the data waveform. It can be aligned with D1, D2, D3 or alignment with no buoy at all as shown by the dotted line. The integral for T1 aligned with D1 is determined. The integral of T1 aligned with D2 is then determined. The integral of T1 aligned with D3 is then determined. Finally, the integral of T1 with no alignment is determined by integrating the area between the waveforms after aligning T1 with that point on the data waveform which has the same ratio to the entire data waveform that T1 has to the entire template waveform. One of these alignments will provide a lower integral than the other alignments, which will be used as further explained herein.

The next step is the alignment of the second buoy in the template, T2, with the sample data waveform. As shown in FIG. 8a in the event that T1 is aligned with D1, T2 can be aligned any one of four ways shown respectfully as T2 with D2, D3, D4 or no match. In the event that T1 is not aligned with any of the buoys of the data, T2 could be aligned five different ways to the buoys of the data waveform, that is, T2 with D1, D2, D3, D4 or no alignment. Also as shown in FIG. 8a, if T1 is aligned with D2 then T2 can be aligned three different ways.

It is important to note that if T1 is aligned with D2 that T2 will not be aligned with D1. That is, a subsequent buoy in the template data may not cross over and be aligned with a prior buoy in the waveform if a prior buoy in the template waveform has been aligned with that buoy or a subsequent buoy in the data waveform. Therefore, if T1 is aligned with D3 then T2 can be aligned either with D4 or can be not aligned with any buoy, but it cannot be aligned with D1, D2 or D3.

As illustrated in FIG. 8a using only the first two buoys aligning with four adjacent buoys, 14 possible ways of alignment of the waveform can be determined and the integral for each of these alignments will be determined. If a third buoy is then used as illustrated in FIG. 8a there are 47 possible ways to align each of the three buoys of the template data with buoys in the data waveform. The result is that after 20 or 30 buoys are aligned there would be $A10^{11}$–$10^{16}$ possible alignments of buoys each for which an integral must be determined in order to determine which buoys in the template waveform best align with buoys of the test data waveform to give the lowest overall integral. This is also an extremely large number and would take an excessively long time for a high speed computer to calculate. The method of aligning buoys using further principles of dynamic programming is therefore used to determine the correct alignment and eliminate incorrect alignments as illustrated in FIGS. 8a and 8c.

FIG. 8b shows the different ways that T2 of the template waveform can be aligned with various buoys of the test character data waveform. As illustrated in FIG. 8b there are eight ways with which T2 can be aligned with D4 depending on the location of T1. According to the method of this invention only the particular combination of T2 with D4 having the lowest integral is selected as the best alignment. Each of the four different ways that T1 can be aligned with buoys in the test character waveform will be performed and the integral determined. That alignment having the lowest integral will be provided the rest discarded even though the integral for each was determined. Similarly, T2 could be aligned with D3, D2, D1 or alignment with none at all. Each of these results in different possibilities, each of which will be integrated to determine the best score for each possible alignment of T2 with each of the adjacent buoys. At this point in the aligning process shown in FIG. 8b eight possible alignments have been selected as possible correct alignments and six have been eliminated. Only the lowest integrals were selected as possible alignments. Each of the surviving eight will now be saved and used as the basis for the comparison with T3 as illustrated in FIG. 8c.

If T3 is aligned with D5 as shown in FIG. 8c eight alignments are possible and the integral for each of these alignments will be determined. However, only the lowest integral of the entire set of eight will be selected as the best alignment and will be provided as a possible alignment of T3 with D5. Similarly, T3 will be aligned with D4, D3, D2 and tested with no alignment at all to determine which buoys best align. This results in eliminating 19 of the buoys as not possible alignments because the integral of these buoy alignments has already become excessively large.

An additional step is now taken to further speed up the determination of the best alignment for determining the integral. Of the 12 remaining possible alignments only the best, that is, the lowest scores are retained. The lowest N scores are retained and the rest are discarded and are not used as possible alignments from which additional buoy alignments could be made. At present N has been set equal to eight but is to be understood that N could be selected as any integer.

It has been found that using this method of selecting a value N is effective in performing the alignment and the determination of a minimum number of integrals so as to permit comparison with many possible combinations. When an integral becomes excessively large so as to no longer be possible alignments of the buoys it is eliminated from consideration and is no longer used as the basis for future alignments.

This use of dynamic programming is a significant time saving factor in comparing different portions of the two waveforms with each other. This is also a significant method of aligning the buoys of two digital waveforms with each other. This method is much more detailed than the alignment of merely primary or secondary buoys and provides for alignment of many buoys along the entire length of the waveform. The described method of using dynamic programming effectively test aligns numerous buoy combinations, performs the integral and selects only those alignments which have a low integral. This effectively selects that one alignment from the many possible combinations that would produce the overall lowest integral.

As each of the buoys are aligned with each other the portions between aligned buoys are size normalized to each other appropriately so the waveforms are continuous between aligned buoys. The method as shown in FIGS. 8a–c has been found effective in comparing waveforms of complex handwritten text with other examples of complex handwritten text. It has also been found to be a significant time saving factor in comparing numerous possible alignments of digital waveforms and performing the integral for the various combinations and the elimination of those combinations which would not provide a low score.

The method of determining a waveform from a reference signature, storing an ideal waveform in the template memory and then comparing that waveform to other test data waveforms has been found particularly effective in signature verification. The purpose of signature verification is to determine whether the same person signed both signatures. According to the method of this invention, a candidate enrolls his signature into the template memory. One method by which the candidate may enroll his signature is to sign his name five different times using his standard signature each time. The microprocessor treats the signature as a single character and determines a waveform for each of the respective signatures. The microprocessor then compares the waveform first signature with each of the other four waveforms, the second signature with each of the other four, the third signature with each of the other four and etc. until each of the signatures have been compared with each of the others. Each comparison will be given a score which represents the integral of the area between the two digital waveforms as compared with each other. If each of the five signatures are identical to each other the score will always be zero, however, slight variations between an individual's signature will cause a score to be given which is different for each comparison. That signature having the lowest cumulative score will be selected as the reference signature and stored in the template memory.

The candidate may then sign his name at a later time and have the microprocessor verify that the same person has written the signature. The microprocessor will compare the test signature with the signature stored in the template memory and produce the score representing the degree of match between the two signatures. If the same person is signing the name the score will likely be in the range of 30–40 and never be greater than 50. However, if another person attempts to sign the name of the first person stored in the template memory the score is usually over 100 and is always in excess of 60.

The score as stated above is one embodiment which may be used to provide a quantitative output of the comparison of the waveforms. This score is determined by determining the integral of the difference between the waveforms and then dividing this number by the number of data points in the waveforms. Because of size normalization the waveforms will have the same overall length in most methods of alignment. The resulting score is therefore an indication of the average difference between the waveforms at any one point along the waveforms. This is because the overall integral for the entire length is divided by the number of data points. In this manner, a person having an extremely short signature may have an overall integral which is much less than a person having an extremely long signature however the average difference between respective waveforms compared to these waveforms may be similar.

When buoys in the waveform are aligned the number of data points between the buoys before being aligned can be determined. The waveform score may be adjusted by a penalty factor if the buoys were shifted an excessive number of data points to provide the alignment having the lowest integral. This method permits some relative size variations and does align the buoys but adds a penalty factor to represent the amount of "stretching" the waveforms did to align with each other.

Actual numbers have been given for scores in examples herein. It is to be understood that these are merely examples and not limiting in any way as to the quantitative output of this invention. In the examples given the difference in the waveforms has been multiplied by a constant so as to increase the number and provide a more distinct separating line in the higher number ranges. The other score which is part of the numerical output is the data point number which is described more fully herein.

An example of signature verification is shown in FIGS. 1a–3b. FIG. 1a is the ideal, that is, reference signature of Warner C. Scott and FIG. 1b is the waveform produced from this reference signature. FIG. 2a is a signature by the same person, Warner C. Scott, written several months later. An eyeball comparison of FIGS. 1a and 2a shows there are considerable similarities but some differences between the two signatures. For example, the r's are slightly different in the word "Warner", the C has somewhat different curves to it as does the S and the o in each of the two signatures. Addtionally, the second signature is considerably larger than the first. Numerous other detailed differences between the two signatures can be recognized by the eye. The waveform of FIG. 2a is shown in FIG. 2b. A comparison of the digital waveform of FIG. 2b with FIG. 1b produced a score of 38/29. This is a good score and well within the range of accepted scores for a matching signature.

FIG. 3a is an example of a third party attempting to forge the name of Warner C. Scott while viewing FIG. 1a in attempting the forgery. As can be seen there are some differences between 3a and FIG. 1a. However, there are also differences between FIGS. 2a and 1a. Viewing FIG. 3a it can between that the W is made slightly different, however, the r's are made more similar to FIG. 1a than the r's of FIG. 2a were made to FIG. 1a. Additionally, other portions of the attempted forgery of FIG. 3a are somewhat different than the ideal signature in FIG. 1a even though the differences are very minor. The waveform of the signature in FIG. 3a is shown in FIG. 3b. The waveform of the forgery shown in FIG. 3b received a score of 128/53 when compared with the waveform of FIG. 1b. This is an extremely high score and well outside the range of the same person signing the signature.

It is possible for a third party forging the name of the template memory to produce a name which looked identical after both names were formed but the forgery not receive a passing score. This is because the waveform indicates the order in which the strokes were made and the path of the writing instrument while the signature was made. Therefore, if a person were forging the last name Scott and crossed the t in a different time sequence the digital waveforms would look considerably different as has been explained herein.

This is particularly adaptable to individual signatures because each person signing their name has distinctive perculiarities about the signature of their name. Another example as shown in the name provided of Warner C. Scott is in placing the period after the C. If the period is placed after the "C" at the end of the entire signature the waveform will have certain characteristics, however, if the period is placed after the "C" immediately after the "C" is formed the waveform will have considerably different characteristics and would not receive a passing score if compared to each other. Because of the great differences in the order in which people write different parts of their name including dotting i's, crossing t's, making loops in various letters and other portions of their signature it would be necessary for a forger to not only copy the signature exactly so that the final product looked identical, it would also be necessary for the forger to follow the movement of a pen in an identical fashion to the movements which were made when the original signature was written.

It is significant to note that when the person signs both names quite differently they will likely receive a passing score. The major flow of the signature will likely be identical and the stroke order the same, even if some letters are formed in different ways, such as having one letter higher, the loops open or closed, different slant and etc. The waveform is very effective in allowing minor variation, so long as the same person is signing and thus providing the same basic waveform. This is due mostly to the use of dynamic programming to align the waveforms prior to the score being given. Dynamic programming, as described previously effectively aligns all important parts of the signatures and tests numerous alignments to find the correct one. This allows a person to always get a passing score on his signatures and prevents a passing score on other signatures.

The ranges of 30-45 as acceptable and 75 and higher as unacceptable are given as approximate ranges. As more test data is collected the range may change. It is possible for a person to get a score out of the acceptable range when signing his own name if, for example, he spells his name differently, leaves letters out or makes a few characters radically different than the rest, such as printing some when the reference signature is all in cursive. Even in the examples given however, the score is often within the correct range.

Another technique may also be used to distinguish whether the same person is providing the subsequent signature who provided the original signature. This was given as the second number after the first in the scores 38/29 and 123/53. As previously stated the waveform was specifically designed to remove time and the speed with which the signature is written as a factor in the determination of which signature was being made. The factor of time and the speed with which individual characters are formed has been placed into the signature verification as a separate step to further aid in verifying the identity of the person providing the name.

The number of data points received while the signature was being made was indicated above as the second number in the set, for example, in FIG. 2b the score was 38/29. 38 is proportional to the average integral of the difference between the two waveforms. The number 29 is proportional to the number of data points received while the signature is being written. Data points are received at a predetermined clock pulse rate therefore the number of data points is directly related to the speed of the pen while moving on the paper as the signature was written.

The data point number is determined by dividing the data count of the reference signature, that is, by dividing the number of data points in the sample signature by the number of data points in the reference signature then multiplying the quotient by 32. The multiplier 32 was selected to make both numbers about 30 for an acceptable score.

For example, 320 points in the referenre signature and 290 points in the sample signature would be given a time score of 29 as follows (290*32)/320=29. This is an effective method used in combination with the waveform to determine forgeries. This directly reflects the speed of the writing instrument over the path followed. An individual is very uniform in the speed at which he signs his name each time. It is important to note that this is not a direct time measurement. New data points are not determined when the pen has not moved or when the pen is off the paper. Data points are only determined if the writing instrument is on the paper and at a new position. Therefore, the data point number directly reflects speed of movement while moving the pen on the paper and only indirectly relates to time.

This has been found very effective for detecting forgeries, especially when the signature is traced. It is very difficult, if not impossible for a forger to move the pen at exactly the same speed as the original signer while attempting to copy their signautre. This would require the forger to not only perfectly copy the signature in the stroke order it was made but also move the pen the same speed while on the paper.

The signature of FIG. 3b had a score of 123/53. The score of 123 is proportional to the average integral of the difference between two digital waveforms and the high magnitude of the score indicates that the same person did not make both of the signatures. Additionally, the second number, 53, indicates that the same person did not make both signatures because of the large number of data points received while the signature was being written. The score of 53 would be received as follows, for example, 320 points in the reference signature, 530 data points in sample signature provides (530*32)/320=53. An acceptable data point score is under 40. A lower boundary of the data point score could be determined depending on the application. The range could also be greatly narrowed and tailored to fit the individual. This indicates that the signature of FIG. 3a is considerably slower than the signature stored in the template memory. It is so much slower that if the same person is signing the name they would not write their name at this speed. This also has been based on considerable collective data which shows that people consistently sign their name at almost identical speeds each time they sign it regardless of the use or size. Because of the individual styles manifest in each persons signature and the differences in speed all of which are extremely uniform within an individual person but vary greatly from person to person this technique has been found to be extremely effective in verifying whether two signatures were signed by the same person or not.

It can be seen that this invention provides two alternate scores each of which is used in determining whether or not the same individual has signed the name and both are used to determine signature verification. If either one of the tests provides a score which is too high the signature is rejected as not matching the reference signature. This has been found to be an effective technique. The waveform is specifically designed so that time is of no significance and the data count is specifically designed to be sensitive to time and the speed with which the pen moves on the data tablet.

An additional feature which may be used in this invention is a total time elapsed. The person signing the name can be given a set time, for example, ten seconds in which to sign the name after beginning the signature. This is quite a different factor than the data count number in that the time will continue to be counted whether or not new data points are found on the data tablet. If the individual signing exceeds the maximum time permitted for a signature they would be rejected and the signatures would not even be compared because of the excessive time elapsed in producing the signature. This elapse time could also be varied from individual to individual and be made a part of the template memory in the storage to account for the overall time elapsed during which that particular individual signs their name. This may be a useful technique depending on the individual and if the speed with which they sign their name is always uniform.

Figure 10:
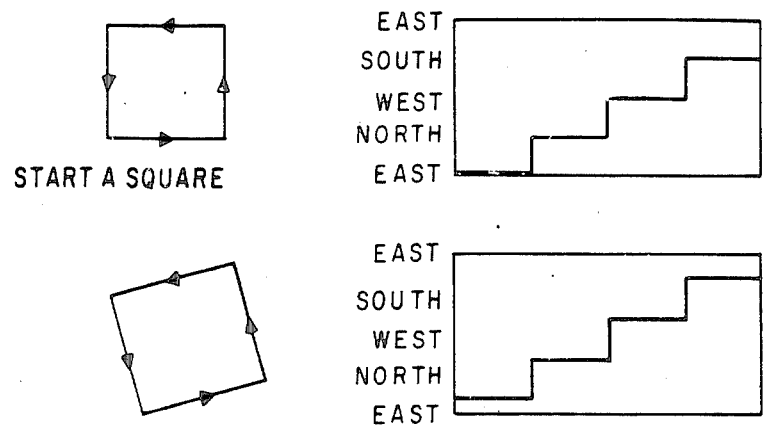
FIG. 10 illustrates removing relative slant from the waveform.

It may be desirable to remove relative slant between the waveforms depending on the application and the signature being verified. FIG. 10 illustrates the method by which relative slant in a signature or a character is translated into the waveform. Relative slant will be indicated by an overall rotation either up or down in the overall waveform. This is very similar to having a D.C. bias in an electrical signal. This is another considerable advantage of the use of the waveform and the conversion of the signature using polar coordinates. The use of polar coordinates $(r, \sqrt{\ })$ is useful in producing a waveform which will have th same shape regardless of the starting point as illustrated in FIG. 10. Viewing FIG. 10 it can be seen that the waveform of the square drawn without slant will be identical to a square drawn with slant but will be offset in the direction coordinate, that is, the ordinate of the waveform.

It may be desirable to remove relative slant from signatures in some uses of this invention. This can be done by numerous techniques, including aligning only the starting point of each of the waveforms with each other, aligning the average height of the waveforms with each other over their entire lengths or other techniques. FIG. 7c demonstrates the removal of relative slant between two waveforms by aligning the average height of the characters. This is one possible technique for performing a horizontal correction if desired. It is important to note, however, that in many embodiments there will be no correction for relative slant between signatures. The slant with which a person writes may be one of the key features which distinguishes their signature from others and prevents their signature from being forged. In this instance relative slant would not be corrected for between the waveforms. Failure to correct for relative slant results in a considerably higher score because the buoys will be aligned exactly on top of each other with the integral of the area between the curves much larger than if the relative slant were corrected for. Therefore, in many signature applications it will be most desirable to not correct for relative slant between the signatures.

Figure 11:
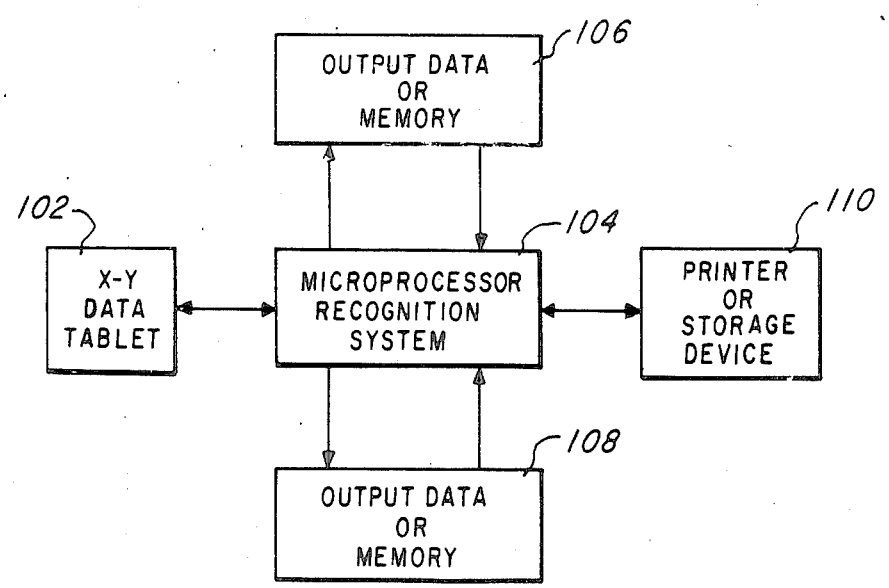

This invention includes, among other features, the ability to function as a printer. FIG. 11 shows a possible typewriter system.

Data could be input through the X-Y data tablet 102 from the handwritten text of a user. Other data tablets and input means could be used as discussed herein. The data is fed to a microprocessor board or system 104. The microprocessor functions using program memory which can be stored in ROM, provided as input data or provided by other program operable functions. The template memory could be stored in 106.

The template memory 106 could be ROM which contains all the data to completely and uniquely verify an individuals signature or to recognize each character in the set being written onto the X-Y data tablet. Alternatively, the template memory could be supplied as input data from a terminal by a user. The user could specify the signature or the character set and the template memory which the microprocessor would use in comparing reference data with the sample data from the X-Y data tablet. This would allow the user to program the character to be recognized and specify characteristics to uniquely define them if desired. This would make the machine adaptable to many font types, handwriting styles, signatures, languages, code words and etc. For example, the memory 106 could be altered to fit an individual user's handwriting style. This could be done by the user supplying samples of some or all characters to be recognized and then adjusting the template memory accordingly. An adaptable and programmable template memory might be useful in word processing especially. This would allow the user to specify word processing commands, data selection, printing, storage and other data manipulation merely by moving the writing instrument on the X-Y data tablet. Using this service a person would not be required to have typing skills to alter, retrieve, print, store and perform other word processing functions. This could also be most useful in other languages, such as, Japanese, Chinese, etc.

This system is extremely valuable for Japanese, Chinese and other languages that do not fit well on a keyboard. The use of keyboard is not necessary for this system used as a typewriter. A user could write a complex Japanese Kanji on the data tablet and have the character printed simultaneously by printer 110 while being stored and made available for word processing techniques. This uses a very simple and easy to use system in place of a keyboard input. Additionally, little or no training to use the system is required. All that is necessary is for the user to write the desired data on the X-Y data tablet, the signature would be compared or the character would be recognized and the computer code for that character provided by microprocessor 104 working with template memory 106 and the rest of the system.

This solves a long felt need in the area of typewritten text and word processing. This makes the use of 2000 to 3000 keys on a keyboard unnecessary as is presently used on Japanese typewritten systems. This also allows the American executive to type messages directly using only a data tablet and pen without the need of any special skills or training. The data tablet could also provide word processing of previously stored data.

When the microprocessor recognizes a character the ASCII code or JISC (Japanese Industrial Standard Code for Information Interchange) could be provided by the microprocessor 104 working with input data or template 106. The JISC code is then supplied to a printing system. The Japanese Industrial Standard Code for Information Interchange (JISC), is coded in terms of pairs of 7-bit characters and contain about 7000 Kanji characters, in addition to Roman, Greek, Cyrillic, Katakani, Hiragana and other special symbols. FIG. 11 shows output data 108 which would control a wire matrix printhead 110. In FIG. 11 the output data would have stored or supplied from a terminal the print control signals for each character as it is recognized. The data stored could be similar to that indicated by Hershey, A. V. in his report titled "Calligraphy for Computers", Technical Report No. 2101 (Aug. 1967), U.S. Naval Weapons Laboratory, Dahlgren, VA., 22448, or by Hoyashi, H and Duncan S. in some of their reports, one of which is "Graphical Input of Non-Standard Characters", Comm. ACM 11, 613–618 (1968). Alternatively, an ink jet printer with appropriate control system could be used. With an ink jet printer or other printer system the interaction of microprocessor 104, output control system 108 and printer 110 could change considerably. In this way a handwritten character is printed directly in typed form and simultaneously stored for further processing if desired.

FIG. 11 is a possible embodiment. Parts represented by 108 and 110 may be used as output indication devices for signature verification. 108 would indicate whether the signatures match and 110 could provide the results of the match or any transaction completed, such as a book transfer. In some systems 108 and 110 may not be necessary and may be replaced by a data storage system for later printing and processing. Any possible print system could be used.

The system operates as follows. A user provides a character on the X-Y data tablet. The microprocessor recognizes that character or performs signature verification functioning with the template memory or input data using the methods described herein and the microprossor supplies the desired code, either JISC, ASCII or other language symbols computer code which corresponds to the handwritten character. The output data system uses this supplied code as directed by the memory or terminal data control such as for printing the character, moving documents, making graphs, storing the character's code in memory, word processing or any other desired task.

The system is seen as a trememdous step forward in Japanese and Chinese typewriters, information storage and processing and other techniques. The methods herein describe a character recognition system for Japanese and Chinese characters which is very effective, powerful yet very quick and simple. The techniques are equally effective with English and other handwritten language texts.

A particular apparatus for practicing this invention has now been described. It is to be understood, however, that numerous different techniques for generating the waveform and feeding data into the microprocessor could be used within the scope and bounds of this invention.

Numerous embodiments and advantages of this invention has been described. It is to be understood that this invention is for use in all kinds of handwritten signatures and signatures in any language. The determination of the waveform itself as the continuous polar coordinates from the handwritten text is a particularly effective technique of reducing handwritten text to a form which can be quantitatively compared. Additionally described herein are numerous techniques for manipulating the waveform so that valid comparisons can be made on subsequent signatures. It is to be understood that considerably different embodiments may be combined depending on the type of data which is being read.

It should be understood that numerous features may be obvious from the invention as has been described herein and that minor departures obvious to one of ordinary skill in the art are within the scope and bounds of this invention.

All the attached Appendices I—VI are hereby incorporated by reference into this application.

Appendix I is the software description and implementation of the overall signature verification routine, FORGER.

Attached as Appendix II hereto and hereby incorporated by reference is a program with comments has been which used to determine the waveform of signatures. It is known as subroutine KONTUR in the overall routine of Appendix I.

Also incorporated by reference into this application is Appendix III which is the computer program, subroutine MACHER, with comments to determine the alignment for the comparison of two waveforms using dynamic programming as described herein.

Appendix IV is the computer program, subroutine SCORE, which determines the integral of the area between the waveforms to provide the score.

Appendix V is the computer program, subroutine XTRACT which is the look-up table from which the polar coordinates are extracted.

Appendix VI is the computer program, subroutine SURVEY, which searches for a signature and characterizes buoys.

It is to be understood that numerous other embodiments described herein are not represented by the software attached hereto but could easily be represented if desired and those portions for which a program is not provided are never the less embodiments of this invention.

APPENDIX I

```
C       THIS FILE IS STORED AS FORGER.FOR
        IMPLICIT INTEGER*4 (A-Z)
        CHARACTER FLNM*80,PSW*20
        COMMON/NAME/TY(8192),FY(64),NTY,NFY
        COMMON/TARGET/TX(8192),FX(64),NTX,NFX
        COMMON/TABLET/MVX(8192),MVY(8192),NIN,NMV
        INTEGER*2 INX(1024),INY(1024),INF(1024),NPTS,TIME,PR
C       Initialize bitpad.
        NPTS=1000
        TIME=10
      5 CALL BP_INIT('BITPAD',STATUS)
        IF(STATUS .EQ. 1) GO TO 10
C       Bad status diagnostic
        TYPE 801,STATUS
        ACCEPT 900,NOP
        IF(NOP) 999,5,999
C       Ask for password and read in template data.
     10 TYPE 802
        ACCEPT 902,NL,PSW
        FLNM='[SCOTT.BANK]'//PSW(:NL)//'.DAT'
        OPEN(UNIT=16,NAME=FLNM,TYPE='OLD')
        READ(16,900) NTY,NFY,YIN,DEL,DELL,QB,WD
        READ(16,900) (FY(I),I=1,NFY)
        READ(16,914) (TY(I),I=1,NTY)
        CLOSE(UNIT=16)
```

```
C          Display option menu and input option.
   20 TYPE 804
      ACCEPT 901,NOP
      IF(NOP .GT. 2) GO TO 999
      IF(NOP-1) 40,10,80
C          Aquire signature from tablet.
   40 CALL BP_BLKREAD(INX,INY,INF,NPTS,TIME,PR,STATUS)
      IF(STATUS .EQ. 1) GO TO 50
C          Bad status diagnostic
      TYPE 801,STATUS
      GO TO 20
   50 IF(PR .GT. 64) GO TO 60
C          Insufficient data diagnostic
   55 TYPE 805,PR
   56 ACCEPT 900,NOP
      IF(NOP) 999,20,999
C          No data at all diagnostic
   58 TYPE 806
      GO TO 56
C          Begin foraft truncation procedure.
   60 N=PR+1
   62 N=N-1
      IF(N .LT. 1) GO TO 58
      IF(INX(N) .GT. 1200 .OR. INF(N) .NE. 1) GO TO 62
      M=0
   64 M=M+1
      IF(M .GT. N) GO TO 58
      IF(INF(M) .EQ. 0) GO TO 64
      PR=N-M+1
      IF(PR .LT. 65) GO TO 55
      J=M
      DO 66 I=1,PR
      INX(I)=INX(J)
      INY(I)=INY(J)
      INF(I)=INF(J)
   66 J=J+1
      NIN=PR
C          End foraft truncation procedure.
      CALL MICROV(INX,INY,INF)
      CALL CONTUR
      CALL SURVEY(DEL,DELL,QB)
      IF(NFX .GT. 64) NFX=64
      CALL MACHER(WD,MACH)
      MACH=MACH/NTY
      NACH=32*NIN/YIN
      TYPE 1000,MACH,NACH
      GO TO 20
C-------------------------------------------------
C          Diagnostic output
   80 WRITE(6,903) PSW
      WRITE(6,900) NTY,NFY,YIN,DEL,DELL,QB,WD
      WRITE(6,900) (FY(I),I=1,NFY)
      WRITE(6,914) (TY(I),I=1,NTY)
      WRITE(6,900) NTX,NFX
      WRITE(6,900) (FX(I),I=1,NFX)
      WRITE(6,914) (TX(I),I=1,NTX)
      WRITE(7,920) NIN
      WRITE(7,921) (INF(I),INX(I),INY(I),I=1,NIN)
      GO TO 20
C-------------------------------------------------
  999 CALL BP_RELEASE('BITPAD',STATUS)
      STOP
  801 FORMAT(' STATUS = ',I4,' TRY AGAIN?')
  802 FORMAT('$ PASSWORD? ')
  804 FORMAT('$ ENTER OPTION: 0=SIGN 1=PASSWORD 2=SAVE OTHER=QUIT ')
  805 FORMAT(' ONLY',I3,' POINTS READ!  TRY AGAIN?')
  806 FORMAT(' GOT NO DATA - TRY AGAIN?')
  900 FORMAT(16I5)
  901 FORMAT(I1)
  902 FORMAT(Q,A)
  903 FORMAT(1X,A20)
  914 FORMAT(20I4)
```

```
 920 FORMAT(I6)
 921 FORMAT(15I5)
1000 FORMAT(' SCORE =',I4,' OVER',I4)
     END
```

APPENDIX II

```
C       THIS FILE IS STORED AS KONTUR.FOR
        SUBROUTINE KONTUR(INX,INY,INF,NIN)
        IMPLICIT INTEGER*4 (A-Z)
        COMMON/TARGET/TX(2048),FX(16),NTX,NFX
        INTEGER*2 INX(1),INY(1),INF(1)
        NTX=0
        IA=1
        IB=IA
  2     IB=IB+1
        IF(IB .GT. NIN) RETURN
        IF(INF(IB) .NE. 1) GO TO 2
        DINX=INX(IB)-INX(IA)
        DINY=INY(IB)-INY(IA)
        AINX=IABS(DINX)
        AINY=IABS(DINY)
        IF(AINX .GT. 4 .OR. AINY .GT. 4) GO TO 4
        IF(AINX+AINY-6) 2,2,6
  4     IF(AINX .GT. 9 .OR. AINY .GT. 9) GO TO 10
  6     CALL XTRACT(DINX,DINY)
  8     IA=IB
        GO TO 2
 10     MAX=AINX
        IF(MAX .LT. AINY) MAX=AINY
        N=(MAX+8)/9
        IF(AINX .NE. 0) SX=DINX/AINX
        IF(AINY .NE. 0) SY=DINY/AINY
        MX=N
        MY=N
        KX=AINX+AINX
        KY=AINY+AINY
        N2=N+N
        DO 12 I=1,N
        DX=(KX+MX)/N2
        DY=(KY+MY)/N2
        MX=KX+MX-DX*N2
        MY=KY+MY-DY*N2
        DX=SX*DX
        DY=SY*DY
        CALL XTRACT(DX,DY)
 12     CONTINUE
        GO TO 8
        END
```

APPENDIX III

```
C       THIS FILE IS STORED AS MACHER.FOR
        SUBROUTINE MACHER(WD,MACH)
        IMPLICIT INTEGER*4 (A-Z)
C       The two common blocks below, NAME and TARGET, contain the template
C       and actual signature data, respectively.  TY and TX are the actual
C       digital waveforms.  FY and FX are arrays containing the locations
C       of the buoys in each waveform.  NTY and NTX are the actual number of
C       points in TY and TX, and NFY and NFX are the number of points in
C       FY and FX.
        COMMON/NAME/TY(8192),FY(64),NTY,NFY
        COMMON/TARGET/TX(8192),FX(64),NTX,NFX
C       PATH(I,J,K) and PITH(J) are the arrays which keep track of our
C       intermediate results as the calculation progresses.  It is germane
C       to describe them in detail at the outset.  The first index in PATH
C       ranges from 1 to 8 because we are to be saving the 8 highest ranked
C       matchups between the template and the actual signature as we go.
C       PATH(1,J,K) will contain all the information about the 1st ranked
C       contender, PATH(2,J,K) pertains to the 2nd ranked, etc.  The third
C       index in PATH can have only the values of 1 or 2 and pertains to
C       the temporal history of the calculation.  As we evaluate the various
C       ways we can extend the match of the template to the data through
C       template buoy #N, we will need to retain all of the information
```

```
C           regarding how we got through template buoy #(N-1) until we are en-
C           tirely done with the buoy #N calculation. This is done by defining
C           two variables OLD and NEW which can have the values of either 1 and
C           2 respectively or vice-versa. Information through template buoy
C           #(N-1) is stored in PATH(I,J,OLD) and is used to help compute answers
C           for the values of PATH(I,J,NEW). When finished through template buoy
C           #N, we interchange the values of OLD and NEW and continue to the next
C           template buoy. Thus PATH(I,J,1) and PATH(I,J,2) act as two twin
C           "blackboards" wherein Tweedledum is used to recompute Tweedledee, and
C           then Tweedledee is used to recompute Tweedledum, etc. ad nauseum.
C
C           The middle index J of PATH(I,J,K) contains the real information!
C           PATH(I,1,K) contains the subscript of the particular buoy point in
C           TX which has been tied to TY, and PATH(I,2,K) contains the corres-
C           ponding point in TY. These numbers are the actual subscripts in
C           TX and TY, not in FX and FY. For example, if buoy #4 in TX which
C           is the 88th value in TX has been tied to buoy #5 in TY which is the
C           99th value in TY, then PATH(I,1-2,K) will contain the values 88 and
C           99 respectively, not 4 and 5. PATH(I,3-4,K) contains the scores
C           associated with this matchup. The reason that there must be a
C           provision for two scores associated with a matchup is the "no
C           match for this template buoy" option. When we perform this part
C           of the calculation, we must update the integral to a linearly
C           extrapolated point in TX, because if the prior match was in fact
C           a bad one, we want the subsequent waveform mismatch to begin to
C           manifest itself so that this path will suffer in the ranking
C           process. At the same time, we do not wish to discard the score
C           associated with this branch as of the last firm buoy matchup in
C           case it is indeed the correct one and we are simply passing thru
C           a local anomaly. Therefore, we must provide for two score storage
C           locations, even though in the case of all "this TY buoy matches
C           that TX buoy" cases they will be the same number. Therefore,
C           PATH(I,3,K) contains the score thru the last firm buoy matchup
C           on this branch, while PATH(I,4,K) contains the absolutely current
C           score, regardless of a "match" or "no match" condition.
C           PITH(1-4) contains the temporary values which may or may not get
C           loaded into PATH(I,1-4,K).
      DIMENSION PATH(8,4,2),PITH(4)
C           A score of 256*NTY is worse than any theoretically attainable
C           score, and so is sure to be outranked by any real result. We
C           use it several times for preloading purposes.
      BAD=256*NTY
C           Preload PATH with zeros. Loading PATH(NR,4,J) is unnecessary.
C           This establishes that at the beginning of the calculation all
C           paths have point #0 in TX tied to point #0 in TY, and the
C           cumulative score for all paths so far is zero.
      DO 10 NR=1,8
      DO 10 I=1,3
      DO 10 J=1,2
   10 PATH(NR,I,J)=0
      OLD=1
      NEW=2
C           TP is the total # of paths we are dealing with. It will begin
C           with the value of 1 and monotonically increase to 8.
      TP=1
C           If by any chance there are no buoys whatsoever in the template,
C           we skip the entire recursive optimization calculation and jump
C           to 260, where the initialized values will cause us simply to
C           compare the two entire waveforms from start to finish in one
C           fell swoop. This should virtually never happen in signature
C           verification applications, but can occur in handprint recognition.
C           For example, the letters O and C in English and the character
C           "ichi" in Kanji have no buoys in their templates.
      IF(NFY .LT. 1) GO TO 260
C           Otherwise we will use the template buoys to control the outermost
C           loop of the calculation.
      DO 250 KY=1,NFY
C           For the current value of KY in this iteration of the DO 250
C           statement, we are trying to find a match thru buoy #KY in the
C           template. Therefore, when we call subroutine SCORE, YH will
C           always be equal to FY(KY). Therefore, set it and forget it.
      YH=FY(KY)
C           We must establish some general region in TX in which to search.
C           If the template buoy under consideration is 10% of the way thru
```

```
C           the waveform, it will be ridiculous to check for a match to a
C           TX buoy which is 80% thru TX. What we do is first compute
C           the fractional distance into TY that this template buoy is
C           located, a fraction given by FY(KY)/NTY. Multiplication by
C           the arbitrarily chosen factor of 256 is simply because we are
C           in FORTRAN integer arithmetic. To this we add WD, a called-in
C           parameter which defines a "window". This gives us the value
C           XQ = the X at which to quit searching for a match. This will
C           effectively prevent us from searching too far forward. Note
C           that we do not have to worry about reaching too far back, as
C           the TX location of previous matchups ,stored in PATH(I,1,K),
C           will prevent this.
      XQ=256*FY(KY)/NTY + WD
C           Preload new scores with BAD to assure they will be outranked.
      DO 30 NR=1,8
   30 PATH(NR,4,NEW)=BAD
C           The variable KX will denote which buoy in TX we are trying to
C           match to. We will first compute the KX=0 (no match) case.
      KX=0
      NR=0
C           We will investigate all previous paths from NR=1 up to NR=TP.
   90 NR=NR+1
C           Preload XL, YL, and ER from PATH(NR,1-3,OLD) to call SCORE.
      XL=PATH(NR,1,OLD)
      YL=PATH(NR,2,OLD)
      ER=PATH(NR,3,OLD)
C           Then compute a linearly extrapolated value for XH, as we are
C           evaluating the "no match" condition. Note, however, that if
C           the prior history of this branch is distorted enough, it is
C           possible to obtain XH<XL, which must be corrected before
C           calling SCORE. (This probably means that this branch will
C           soon fall out of contention, but we do not know that for sure.)
      XH=XL+(NTX-XL)*(YH-YL)/(NTY-YL)
      IF(XH .LE. XL) XH=XL+1
      CALL SCORE(XL,XH,YL,YH,ER)
C           Load PITH with the results of SCORE. Note particularly what
C           we load into PITH(3-4). We are doing the "no match" case, so
C           while we load PITH(4) with the actual error integral returned,
C           we save the score associated with the last firm matchup in
C           PITH(3).
      PITH(1)=XL
      PITH(2)=YL
      PITH(3)=PATH(NR,3,OLD)
      PITH(4)=ER
C
C           Statements 130 thru 205 are visited whenever we have a new
C           set of results stored in PITH and wish to see if they could
C           be a new member of the "top 8". We drop into them at the
C           end of each "no match" calculation and branch back to them
C           at the end of each "match to data buoy #KX" calculation.
C           We begin with MR, the rank index, equal to 8 and decrease
C           MR until we either find the rank which beats PITH(4) or hit
C           MR=0, whereupon we proceed to statement 150.
  130 MR=8
  140 IF(PITH(4) .GE. PATH(MR,4,NEW)) GO TO 150
      MR=MR-1
      IF(MR .GT. 0) GO TO 140
C           We reach statement 150 with one of three conditions. If
C           MR=8, the score has failed to qualify. If MR=7, the score
C           is the 8th best one we have found, and so merely needs to be
C           written over the cuurent 8th ranked result. If, however,
C           we have MR<7, then we must first do some downshifting in the
C           current "top 8" and then insert these new results in their
C           proper rank order.
  150 IF(MR-7) 160,190,205
C           Perform downshift prior to insertion of new "top 8" member.
  160 KR=7
  170 DO 180 I=1,4
  180 PATH(KR+1,I,NEW)=PATH(KR,I,NEW)
      KR=KR-1
      IF(KR .GT. MR) GO TO 170
C           Insert new "top 8" member.
  190 DO 200 I=1,4
  200 PATH(MR+1,I,NEW)=PITH(I)
```

```
C           Finally, statement 205 decides where to "return" to.
   205 IF(KX .EQ. 0 .AND. NR .LT. TP) GO TO 90
C
C
C           We first reach statement 100 when we have completed all of the
C           "no match" extrapolation calculations and are ready to look
C           for matchups to particular buoys in TX. Now we must change
C           our criteria regarding a visit to the code from statements 130
C           thru 205. Now we seek the matchup between template buoy #KY
C           and data buoy #KX which HAS THE BEST PRIOR HISTORY! Therefore,
C           we will cycle thru all previous paths and save the best returned
C           ER as the variable VAL.  Then VAL which will be rank ordered
C           with the other results.
   100 KX=KX+1
C           If we have no more buoys in TX, we are done.
       IF(KX .GT. NFX) GO TO 215
C           Also, if the fractional way we are thru TX exceeds the "quit"
C           value XQ which was computed earlier, we are done.
       X=256*FX(KX)/NTX
       IF(X .GT. XQ) GO TO 215
C           Otherwise, initialize VAL to the score BAD, which is sure to
C           be beaten by any valid result, set XH= the data buoy location
C           under consideration, and try it on all TP previous paths.
       VAL=BAD
       XH=FX(KX)
       DO 120 NR=1,TP
       XL=PATH(NR,1,OLD)
C           Here is the above mentioned "previous history" preventing us
C           from reaching too far BACK.
       IF(XL .GE. XH) GO TO 120
C           Otherwise, evaluate this potential matchup, and if it produces
C           the best score to date in the 120 do-loop, retain it in VAL.
       YL=PATH(NR,2,OLD)
       ER=PATH(NR,3,OLD)
       CALL SCORE(XL,XH,YL,YH,ER)
       IF(ER .LT. VAL) VAL=ER
   120 CONTINUE
C           If we emerge from all TP previous paths with no valid score at
C           all, forget data buoy #KX entirely and return to 100 for the
C           next one.
       IF(VAL .GE. BAD) GO TO 100
C           Otherwise, load the results into PITH and go back to 130 to
C           see if this possibility will make the "top 8". Note that now
C           PITH(3) and PITH(4) are loaded with identical values.
       PITH(1)=XH
       PITH(2)=YH
       PITH(3)=VAL
       PITH(4)=VAL
       GO TO 130
C           We reach 215 when we have exhausted all possible ways we could
C           have any kind of a match for template buoy #KY. We must now
C           sweep up any loose ends before continuing with the next template
C           buoy. First we loop thru PATH to determine how fare TP has
C           progressed. (Only during the first two or three template buoys
C           will this result in TP being any less than 8.) Then we must
C           interchange the values of OLD and NEW for the Tweedledum/dee bit.
   215 DO 220 NR=1,8
       IF(PATH(NR,4,NEW) .LT. BAD) TP=NR
   220 CONTINUE
       OLD=NEW
   250 NEW=3-NEW
C
C           We reach 260 when we have worked our way entirely thru all
C           template buoys (even when there are none) and are ready to
C           finish the evaluation on thru the ends of the digital waveforms.
C           We again initialize the return parameter MACH to a score sure
C           to be beaten and then cycle thru all surviving paths. Which-
C           ever one results in the best final score is the winner.
   260 MACH=BAD
       DO 280 NR=1,TP
       XL=PATH(NR,1,OLD)
       YL=PATH(NR,2,OLD)
       ER=PATH(NR,3,OLD)
```

```
      CALL SCORE(XL,NTX,YL,NTY,ER)
      IF(ER .LT. MACH) MACH=ER
  280 CONTINUE
C        MACH is the overall returned score, i.e. the final result.
      RETURN
      END
```

APPENDIX IV

```
C        THIS FILE IS STORED AS SCORE.FOR
      SUBROUTINE SCORE(XL,XH,YL,YH,ERROR)
C        This subroutine is the final nitty-gritty digital integral.
C        ----------------------------------------------------------
C        Here we are called upon to compare some portion of one digital
C        function to some other portion of another digital function. The
C        fact that the ranges in the two functions are almost always not
C        exactly the same length poses the question of quantifying where
C        in one function is the point that most nearly corresponds to some
C        other point in the other function. We encounter this same problem
C        in subroutine BUOY. The way to handle this while sticking strictly
C        to integer arithmetic is something I call the "two yardstick" pro-
C        cedure. Suppose we are comparing a section in TX that is 30 data
C        points long to one in TY that is 37 data points long. What we do
C        is to normalize both segments to a "length" of 30*37. We then
C        define a 37 unit long "yardstick" for the TX segment that will be
C        advanced 30 times during the procedure and a 30 unit long "yard-
C        stick" for the TY segment that will be advanced 37 times during
C        the procedure. When we are done both "yardsticks" will have
C        advanced a total of 30*37 units. We can then renormalize our
C        results however we wish with an appropriate divide. In this sub-
C        routine the total "length" we normalize to is (XH-XL)*(YH-YL).
C        ----------------------------------------------------------
      IMPLICIT INTEGER*4 (A-Z)
      REAL Q
      COMMON/NAME/TY(8192),FY(64),NTY,NFY
      COMMON/TARGET/TX(8192),FX(64),NTX,NFX
      ERR=0
C        ML will be the "last" distance we have integrated to.
      ML=0
C        Compute lengths of X and Y "yardsticks".
      JX=YH-YL
      JY=XH-XL
C        MX and MY will be the current "ends of yardsticks".
      MX=JX
      MY=JY
C        X and Y will be the subscript counters.
      X=XL+1
      Y=YL+1
C        Compute the current integrand. 128 is worst case error.
   10 ER=IABS(TY(Y)-TX(X))
      IF(ER .GT. 128) ER=256-ER
C        MB is the branching parameter denoting closer "yardstick end".
C        The reason MB is computed and saved separately is that if our
C        two yardstick lengths happen to contain a common factor, we
C        will have a number of times in the procedure when both have
C        advanced exactly the same distance (referred to as a "tie" in
C        the comments below. In these special cases, we must take care
C        to update both MX & X and MY & Y while only increasing ERR once.
C        Finally, when the "extra special case" of the tie that occurs at
C        the end of the integration comes along, we exit appropriately.
      MB=MX-MY
      IF(MB .GT. 0) GO TO 30
C        X yardstick end is closer (or it is a tie).
      N1=MX-ML
      ERR=ERR+ER*N1
C        If not a tie, jump to 20.
      IF(MB .LT. 0) GO TO 20
C        It was a tie, so check to see if we are done. MX and MY will both
C        equal JX*JY at this point.
      IF(X .EQ. XH) GO TO 50
C        Update ML, MX, and X appropriately.
   20 ML=MX
      MX=MX+JX
      X=X+1
```

```
C           Then if not a tie, go back to 10 for next pass.
      IF(MB .LT. 0) GO TO 10
C           Otherwise, jump to 40 to get MY and Y updated.
      GO TO 40
C           Y yardstick end was closer.
   30 N1=MY-ML
      ERR=ERR+ER*N1
      ML=MY
   40 MY=MY+JY
      Y=Y+1
C           Now go back to 10 for next pass.
      GO TO 10
C           We reach 50 at the end of the raw integration.  Now we must decide
C           how to normalize our results.  The most simple approach would be to
C           divide by (XH-XL)*(YH-YL), which equals JY*JX.  The next considera-
C           tion is that the contribution to the final answer ought to be pro-
C           portional to the fractional part of TY (the master) that we are
C           examining.  This would dictate multiplying by (YH-YL) at this point
C           and dividing by NTY at the end in the main program.  Finally, there
C           is the question of proportionality, i.e. how should we penalize
C           the score for having to "strech or squeeze" the data waveform to
C           get it to fit the template waveform.  For the time being, if one
C           of the two is a fraction Q times longer than the other, we will
C           multiply the final result by Q.
C           The "IF(ER .GT. 128) ER=256-ER" statement makes the worst score be
C           128, while random noise will most likely get a score somewhere near
C           64.  I have arbitrarily decided for the moment to up the apparent
C           "resolution" of these results by a factor of 4.  This is the 4 that
C           appears below.  This ups the "drunk monkey" score to 256.
   50 Q=FLOATJ(JY*NTY)/FLOATJ(JX*NTX)
      IF(Q .LT. 1.) Q=1./Q
      Q=4.*Q*FLOATJ(ERR)/FLOATJ(JY)
      ERR=JINT(Q)
      ERROR=ERROR+ERR
      RETURN
      END
```

APPENDIX V

```
C           THIS FILE IS STORED AS XTRACT.FOR
      SUBROUTINE XTRACT(DX,DY)
      IMPLICIT INTEGER*4 (A-Z)
      COMMON/TARGET/TX(2048),FX(16),NTX,NFX
      DIMENSION R(19,19),PHI(19,19)
      DATA R/13,12,11,11,10,10,9,9,9,9,9,9,9,10,10,11,11,12,13,12,
     111,11,10,9,9,9,8,8,8,8,8,9,9,9,10,11,11,12,11,11,10,9,9,8,8,
     27,7,7,7,7,8,8,9,9,10,11,11,11,10,9,8,8,7,7,6,6,6,6,6,7,7,8,8,
     39,10,11,10,9,9,8,7,6,6,5,5,5,5,5,6,6,7,8,9,9,10,10,9,8,7,6,6,
     45,4,4,4,4,4,5,6,6,7,8,9,10,9,9,8,7,6,5,4,4,3,3,3,4,4,5,6,7,8,
     59,9,9,8,7,6,5,4,4,3,2,2,2,3,4,4,5,6,7,8,9,9,8,7,6,5,4,3,2,1,
     61,1,2,3,4,5,6,7,8,9,9,8,7,6,5,4,3,2,1,0,1,2,3,4,5,6,7,8,9,9,
     78,7,6,5,4,3,2,1,1,1,2,3,4,5,6,7,8,9,9,8,7,6,5,4,4,3,2,2,2,3,
     84,4,5,6,7,8,9,9,9,8,7,6,5,4,4,3,3,3,4,4,5,6,7,8,9,9,10,9,8,7,
     96,6,5,4,4,4,4,5,6,6,7,8,9,10,10,9,9,8,7,6,6,5,5,5,5,5,6,6,
     17,8,9,9,10,11,10,9,8,8,7,7,6,6,6,6,6,7,7,8,8,9,10,11,11,11,
     210,9,9,8,8,7,7,7,7,7,8,8,9,9,10,11,11,12,11,11,10,9,9,9,8,8,
     38,8,8,9,9,9,10,11,11,12,13,12,11,11,10,10,9,9,9,9,9,9,9,10,
     410,11,11,12,13/
      DATA PHI/160,163,165,168,171,175,179,183,188,192,196,201,205,209,
     1213,216,219,221,224,157,160,163,166,169,173,177,187,182,192,197,20
     22,207,211,215,218,221,224,227,155,157,160,163,167,171,175,181,186,
     3192,198,203,209,213,217,221,224,227,152,154,157,160,164,168,
     4173,179,185,192,199,205,211,216,220,224,227,230,232,149,151,153,
     5156,160,165,170,176,184,192,200,208,214,219,224,228,231,233,235,
     6145,147,149,152,155,160,166,173,182,192,202,211,218,224,229,232,
     7235,237,239,141,143,145,147,150,154,160,168,179,192,205,216,224,
     8230,234,237,239,241,243,137,138,139,141,144,147,152,160,173,192,
     9211,224,232,237,240,243,245,246,247,132,133,134,135,136,138,141,
     1147,160,192,224,237,243,246,248,249,250,251,252,128,128,128,128,
     2128,128,128,128,128,0,0,0,0,0,0,0,124,123,122,121,120,118,
     3115,109,96,64,32,19,13,10,8,7,6,5,4,119,118,117,115,112,109,104,
     496,83,64,45,32,24,19,16,13,11,10,9,115,113,111,109,106,102,96,88,
     577,64,51,40,32,26,22,19,17,15,13,111,109,107,104,101,96,90,83,74,
     664,54,45,38,32,27,24,21,19,17,107,105,103,100,96,91,86,80,72,64,
```

```
      756,48,42,37,32,28,25,23,21,104,102,99,96,92,88,83,77,71,64,57,51,
      845,40,36,32,29,26,24,101,99,96,93,89,85,81,75,70,64,58,53,47,43,
      939,35,32,29,27,99,96,93,90,87,83,79,74,69,64,59,54,49,45,41,38,35,
      132,29,96,93,91,88,85,81,77,73,68,64,60,55,51,47,43,40,37,35,32/
        I=DX+10
        J=DY+10
        N=R(I,J)
        M=PHI(I,J)
        DO 4 I=1,N
        NTX=NTX+1
      4 TX(NTX)=M
        RETURN
        END
```

APPENDIX VI

```
C       THIS FILE IS STORED AS SURVEY.FOR
        SUBROUTINE SURVEY(DEL,DELL,QB)
C           This subroutine searches a signature stored in TX and tries to
C           find and characterize buoys.
        IMPLICIT INTEGER*4 (A-Z)
        COMMON/TARGET/TX(8192),FX(64),NTX,NFX
C           Set starting and ending values.
        N=DEL
        NE=NTX-DEL
        NFX=0
C           AQT will be the largest absolute change we have currently found.
      8 AQT=0
     10 N=N+1
C           If we have reached the end of the array, RETURN.
        IF(N .GT. NE) RETURN
C           Compute change between DEL points back and DEL points ahead.
        DIF=TX(N+DEL)-TX(N-DEL)
C           Keep it in the -127 to +128 range.
        IF(DIF .LT. -127) DIF=DIF+256
        IF(DIF .GT. 128) DIF=DIF-256
C           Get absolute value, as it is the magnitude of the change that counts.
        ADIF=IABS(DIF)
C           If we already have a working AQT, skip on to 20.
        IF(AQT .GT. 0) GO TO 20
C           If we don't and this is too small also, forget it.
        IF(ADIF .LT. QB) GO TO 10
C           We reach 15 with a new winner.  Save subscipt and size.
     15 AQT=ADIF
        M=N
        GO TO 10
C           Test new value against pending buoy point.
     20 IF(ADIF .GT. AQT) GO TO 15
C           If it failed, but we are still within DELL points of the pending
C           winner, return to 10 for another point.
        IF(N-M-DELL) 10,10,25
C           We have found a buoy.  Store location in the FX array.
     25 NFX=NFX+1
C           Do not bust dimension, but let NFY pass 64 to flag upon return.
        IF(NFX .GT. 64) GO TO 8
        FX(NFX)=M
C           Return to 8 to begin search for the next buoy.
        GO TO 8
        END
```

I claim:

1. The method of signature vertification comprising:
   (a) inputting a first reference location of a writing instrument while writing a sample signature,
   (b) inputting a second reference location of the writing instrument while writing a sample signature,
   (c) generating a number string representative of a relationship between the first reference location and the second reference location;
   (d) repeating steps b-c using the second reference location as the first reference location thereby generating a series of number strings representative of the sample signature,
   (e) determining the derivative of each of the series of number strings,
   (f) selecting those number strings as buoys whose respective derivatives are greater than a buoy threshold value,
   (g) lowering the buoy threshold value if the number of buoys in the sample signature is less than a predetermined minimum value and selecting those number strings as buoys whose respective derivatives are the greater than the lower buoy threshold value,
   (h) raising the buoy threshold value if the number of buoys in the sample signature is greater than a predetermined maximum value and selecting those number strings as buoys whose respective derivatives are greater than the raised buoy threshold,
(i) aligning the buoy of the sample signature with buoys of a reference signature,
(j) comparing the sample signature series of number strings to a series of number strings representative of the reference signature; and,
(k) providing an output indicating if the same individual wrote the sample signature and reference signature.

2. The method according to claim 1 wherein the number string is comprised of a plurality of numbers, each number in the number string having the same value, the value indicating the direction of movement of the writing instrument from the first reference location to the second reference location and the number of numbers within the number string indicating the distance from the first reference location and the second reference location.

3. The method according to claim 1 wherein the number string is comprised of two numbers, one number indicating the direction of movement of the writing instrument from the first reference location to the second reference location and the second number indicating the distance from the first reference location and the second reference location.

4. The method according to claim 1 wherein the same buoy threshold value is used for the reference signature and the sample signature.

5. The method according to claim 1 wherein a different buoy threshold value is used for the reference signature than that used for the sample signature.

6. The method according to claim 1 wherein the aligning of the buoys of the sample signature with buoys of the reference signature further includes aligning a first set of buoys of the sample signature with a first set of buoys with the reference signature, determining the degree of similarity between those number strings defined by the first set buoys of the sample signature and those number strings defined by the first set of buoys of the reference signature, aligning the first set of buoys of the sample signature with a next set of buoys of the reference signature, determining the degree of similarity between the number strings defined by the first set of buoys of the sample signature and the number strings defined by the next set of buoys of the reference signature, selecting that buoy alignment which provides the greatest degree of similarity and continuing determining the degree of similarity of the number strings defined by the buoys of the sample signature with the number strings defined by the buoys of the reference signature for all buoys in the sample signature.

7. The method according to claim 4 wherein there is a different number of buoys in the reference signature and sample signature.

8. The method according to claim 5 wherein the first set of buoys of the sample signature is comprised of one buoy.

* * * * *